United States Patent
Sugita et al.

(10) Patent No.: US 8,010,975 B2
(45) Date of Patent: Aug. 30, 2011

(54) DISC CARTRIDGE AND PHOTON MODE OPTICAL INFORMATION RECORDING/REPRODUCING APPARATUS

(75) Inventors: Tomoya Sugita, Osaka (JP); Kenichi Kasazumi, Osaka (JP); Tetsuro Mizushima, Osaka (JP); Kazuhisa Yamamoto, Osaka (JP); Shinichi Kadowaki, Hyogo (JP); Teruyuki Takizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1033 days.

(21) Appl. No.: 11/885,444

(22) PCT Filed: Feb. 23, 2006

(86) PCT No.: PCT/JP2006/303315
§ 371 (c)(1),
(2), (4) Date: Aug. 31, 2007

(87) PCT Pub. No.: WO2006/093025
PCT Pub. Date: Sep. 8, 2006

(65) Prior Publication Data
US 2008/0172687 A1    Jul. 17, 2008

(30) Foreign Application Priority Data
Mar. 2, 2005   (JP) .................................. 2005-057896

(51) Int. Cl.
*G11B 17/04* (2006.01)
(52) U.S. Cl. ........................................ 720/738
(58) Field of Classification Search ........... 720/725–744
See application file for complete search history.

(56) References Cited

U.S. PATENT DOCUMENTS

| | | | |
|---|---|---|---|
| 5,748,595 A | 5/1998 | Nakajima | |
| 7,337,454 B2 * | 2/2008 | Tajima et al. | 720/738 |
| 7,373,649 B2 * | 5/2008 | Sato | 720/741 |
| 2001/0010680 A1 * | 8/2001 | Kikuchi et al. | 369/291 |
| 2001/0055270 A1 | 12/2001 | Obata et al. | |
| 2003/0198177 A1 * | 10/2003 | Horimai et al. | 369/291 |
| 2004/0244028 A1 * | 12/2004 | Park | 720/739 |
| 2006/0143642 A1 * | 6/2006 | Kawasaki et al. | 720/738 |
| 2006/0246375 A1 | 11/2006 | Shiono et al. | |

FOREIGN PATENT DOCUMENTS

JP    7-134880    5/1995

(Continued)

OTHER PUBLICATIONS

Chinese Office Action (along with English language translation) issued Jun. 26, 2009 in the Chinese Application No. 200680006635.6.

*Primary Examiner* — Mark Blouin
(74) *Attorney, Agent, or Firm* — Wenderoth, Lind & Ponack, L.L.P.

(57) ABSTRACT

A disc cartridge accommodating a photon mode optical information recording medium is provided with a disc case having an opening section, and a shutter movably disposed between a closing position to close the opening section and an opening position to open the opening section. The disc case includes a light path bending portion for bending a clearance between the shutter at the closing position and the disc case at least at two points. Stray light propagating in the clearance between the disc case and the shutter is bent at least at two points.

10 Claims, 24 Drawing Sheets

FOREIGN PATENT DOCUMENTS

| | | |
|---|---|---|
| JP | 8-329581 | 12/1996 |
| JP | 2000-40331 | 2/2000 |
| JP | 2001-283556 | 10/2001 |
| JP | 2003-157641 | 5/2003 |
| JP | 2004-14115 | 1/2004 |
| JP | 2004-139711 | 5/2004 |
| JP | 2004-265511 | 9/2004 |
| JP | 2004-362743 | 12/2004 |
| WO | 2004/107040 | 12/2004 |

* cited by examiner

DISC CARTRIDGE AND PHOTON MODE OPTICAL INFORMATION RECORDING/REPRODUCING APPARATUS

BACKGROUND OF THE INVENTION

I. Technical Field

The present invention relates to a disc cartridge and a photon mode optical information recording/reproducing apparatus used for recording/reproducing photon mode optical information.

II. Description of the Related Art

A common disc-shaped recording medium (hereinafter, referred to as a medium) represented by magnetooptical recording or phase change recording is rotatably contained in a disc case. The disc case includes an opening section through which the outer surface of the medium is exposed and a slidable shutter for opening and closing the opening section.

Since an optical disc information recording/reproducing apparatus records and reproduces information by substantially focusing a laser light to a diffraction limit, information recording/reproducing characteristics are degraded upon an occurrence of dust adherence or accumulation to or on the outer surface of the medium. Particularly, since the medium features in being portable and providing compatibility among information recording/reproducing apparatuses, it has been a big problem to prevent the intrusion of dust into the case or the adherence of dust to the outer surface of the medium outside the information recording/reproducing apparatuses. Accordingly, a great number of proposals have been made such as those to improve dust resistance and those concerning the construction of disc cases and disc cartridges to prevent damage on recording surfaces of media, for example, as disclosed in Japanese Unexamined Patent Publication No. 2000-40331 and Japanese Unexamined Patent Publication No. 2004-14115.

On the other hand, a photon mode optical information recording/reproducing apparatus has been proposed as a candidate for a next-generation large-capacity storage device. The photon mode optical information recording/reproducing apparatus adopts recording and reproducing methods different from the conventional optical disc devices, and a hologram memory device, for example, as disclosed in Japanese Unexamined Patent Publication No. 2004-139711 can be cited as a typical example. In a hologram memory optical information recording system such as a hologram memory optical system adopting a shift multiplexing recording method proposed by Psaltis et al., a beam from a laser light source has its diameter expanded by a beam expander and, then, this beam is split by a half mirror. One of the split beams passes a spatial light modulator and is focused on a hologram medium by a Fourier transform lens to become a signal light. The other beam is irradiated to the same position as the signal light on the hologram medium to become a reference light. The hologram medium is constructed such that a holographic medium such as photopolymer is sealed between two glass substrates, and interference fringes of the signal light and reference light are recorded.

In the spatial light modulator, a two-dimensionally arranged optical switch array is provided, and the respective optical switches are independently turned on and off in accordance with an input signal to be recorded. For example, in the case of using a spatial light modulator of 1024 cells×1024 cells, information of 1 M bits can be simultaneously displayed. The information of 1 M bits displayed on the spatial light modulator when a signal light passes the spatial light modulator is converted into a two-dimensional light beam array. This light beam array is recorded as interference fringes on the hologram medium. In order to reproduce the recorded signal, only the reference light is irradiated to the hologram medium and a diffracted light from a hologram is received by a CCD element.

The aforementioned hologram memory optical information recording system is characterized in that angle multiplexing recording is possible to realize a large-capacity optical recording system since the holographic medium is as thick as about 1 mm and the interference fringes are recorded as a thick grating, i.e. a so-called Bragg grating. Instead of changing an incident angle of the reference light, it is also possible to realize angle multiplexing recording by shifting the irradiation position of the reference light in the form of a spherical wave. Specifically, there are utilized slight changes in the incident angle of the reference light sensed by the respective parts of the medium upon shifting the recording position by slightly rotating the disc-shaped medium. When the thickness of the holographic medium is 1 mm, wavelength selectivity specified by the intensity of the reproduced signal is 0.014 degrees at full width at half maximum. When the reference light NA is 0.5 and the hologram size is 2 mm$\phi$, recording density realized at this time is 600 G bits/inch$^2$ if a hologram is recorded in a multiplexing manner at intervals of about 20 microns. This is equivalent to 730 GB in a 12 cm disc capacity.

Japanese Unexamined Patent Publication No. 2004-362743 shows a holographic disc cartridge. A Japanese Unexamined Patent Publication No. 2004-362743 discloses a locking mechanism for preventing an inadvertent opening of a slide shutter.

A medium used in the optical information recording/reproducing apparatus with an optical photon mode is made of a so-called photosensitive material in the nature of the recording method. Thus, this medium has sensitivity to lights having wavelengths below a visible light region such as ultraviolet rays and green lights. If a non-recorded area of the medium is photosensitized before recording, this has presented a problem of fatally degrading the characteristics such as a reduction of a recordable capacity. Although the disc cartridges for optical discs (magnetooptical discs, CDs, DVDs, etc.) disclosed in Japanese Unexamined Patent Publication No. 2000-40331 and Japanese Unexamined Patent Publication No. 2004-14115 have effective constructions in terms of dust resistance, it is substantially impossible to optically completely shield the media since there is no concept of complete shielding. Thus, if an attempt is made to apply the disc cartridge construction for optical discs to those used in photon mode optical information recording/reproducing apparatuses, there has been a problem of causing the above characteristic degradation, for example, by a stray light entering through a clearance between the slide shutter and the cartridge case. Although it is disclosed that the slide shutter slides relative to a cartridge shell in the disc cartridge of Japanese Unexamined Patent Publication No. 2004-362743, there is a possibility of creating a clearance between the cartridge shell and slide shutter due to the vibration of the slide shutter or the like since the slide shutter is merely placed on the cartridge shell. Accordingly, complete light shielding is difficult in this disc cartridge.

SUMMARY OF THE INVENTION

Accordingly, in view of the above problems, an object of the present invention is to make it difficult to degrade optical characteristics of a photon mode optical information recording medium with a simple construction.

In order to accomplish the above object, the present invention is directed to a disc cartridge accommodating a photon mode optical information recording medium, comprising a housing having an opening section, and a shutter disposed to be movable between a closing position to close the opening section and an opening position to open the opening section, wherein at least one of the housing and shutter includes a light path bending portion for bending a clearance between the shutter at the closing position and the housing at least at two points.

In the present invention, since stray lights propagating in the clearance between the housing and shutter is bent at least at two points by the light path bending portion, it can be made difficult for the stray lights entering through the clearance to reach the photon mode optical information recording medium even if there is the clearance between the housing and shutter, thereby making the degradation of the optical characteristics of the photon mode optical information recording medium more difficult to occur. Further, it can be suppressed to complicate the construction of the disc cartridge since the light path bending portion is simply provided at the housing or shutter.

The present invention is also directed to a photon mode optical information recording/reproducing apparatus for at least either recording or reproducing information in or from a photon mode optical information recording medium, comprising a holder for holding the above disc cartridge, and a structural element including a light shielding plate for suppressing the entrance of stray lights into the disc cartridge and attachable to the holder.

In the present invention, the degradation of the photon mode recording medium can be suppressed since the entrance of stray lights into the disc cartridge can be suppressed by the light shielding plate upon the optical recording.

BRIEF DESCRIPTION OF THE DRAWINGS

FIGS. 1A to 1C show a disc cartridge according to a first embodiment of the invention, wherein FIG. 1A is a perspective view showing a state where a shutter is closed, FIG. 1B is a perspective view showing a state where a shutter is open and FIG. 1C is a section, FIGS. 5A and 5B show a disc cartridge according to a second embodiment of the present invention, wherein FIG. 5A is a section showing a state where a shutter is closed and FIG. 5B is a section showing a state where the shutter is open, FIGS. 9A and 9B show a disc cartridge according to a third embodiment of the present invention, wherein FIG. 9A is a section showing a state where a shutter is closed and FIG. 9B is a section showing a state where the shutter is open, FIGS. 11A and 11B show a disc cartridge according to a fourth embodiment of the present invention, wherein FIG. 11A is a section showing a state where a shutter is closed and FIG. 11B is a section showing a state where the shutter is open, FIGS. 14A and 14B show a disc cartridge according to a sixth embodiment of the present invention, wherein FIG. 14A is a section showing a state where a shutter is closed and FIG. 14B is a section showing a state where the shutter is open, FIGS. 15A and 15B show a disc cartridge according to another example of the sixth embodiment of the present invention, wherein FIG. 15A is a section showing a state where a shutter is closed and FIG. 15B is a section showing a state where the shutter is open, FIGS. 16A and 16B show a disc cartridge according to a seventh embodiment of the present invention, wherein FIG. 16A is a section showing a state where a shutter is closed and FIG. 16B is a section showing a state where the shutter is open, FIGS. 17A and 17B show a disc cartridge according to the seventh embodiment of the present invention, wherein FIG. 17A is a perspective view showing the state where the shutter is closed and FIG. 17B is a perspective view showing the state where the shutter is open, FIGS. 19A and 19B show a disc cartridge according to a ninth embodiment of the present invention, wherein FIG. 19A is a perspective view showing a state where a shutter is closed and FIG. 19B is a perspective view showing a state where the shutter is open, FIGS. 20A to 20C show a disc cartridge according to a tenth embodiment of the present invention, wherein FIG. 20A is a perspective view showing a state where both first and second shutters are closed, FIG. 20B is a perspective view showing a state where the first shutter is open and the second shutter is closed, and FIG. 20C is a perspective view showing a state where both first and second shutters are open.

DETAILED DESCRIPTION OF THE INVENTION

Hereinafter, best modes for embodying the present invention are described in detail with reference to the accompanying drawings.

First Embodiment

The entire constructions of disc cartridges according to embodiments of the present invention and the complete light shielding capability of an optical information recording medium in which information is recorded in a photon mode are described.

Photon mode optical information recording media such as hologram media (hereinafter, merely referred to as "media") generally contain a reaction inhibitor for easiness to handle.

Thus, the media have nonlinear photosensitivity and are not photosensitized under the irradiation of low-power lights. Specifically, if an amount of light irradiated to the medium is equal to or below 100 nanojoules/cm$^2$, optical characteristics are not degraded even if the light irradiation to the medium should be continued for a long time. Accordingly, what is at issue in the present invention is to prevent the entrance of stray lights equal to or above the above light irradiation amount, and a state of irradiation equal to or below the above light irradiation amount is called a completely light-shielded state. In this specification, that "the completely light-shielded state has been reached" is written as "the realization of complete light shielding" or merely "complete light shielding".

Although the "disc-shaped medium" is described in this specification, this does not intend to limit the shape of the medium to a disc shape. In other words, it is sufficient for the media to be rotatable or movable plate-shaped media. In this case as well, similar effects can be obtained for the essence of the present invention.

Figure 1A:
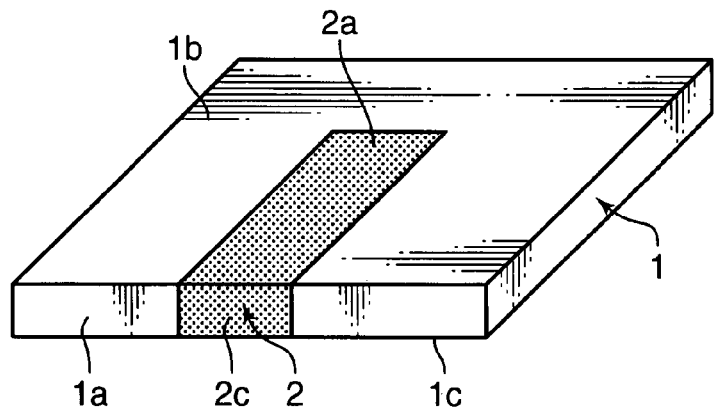
Figure 1B:
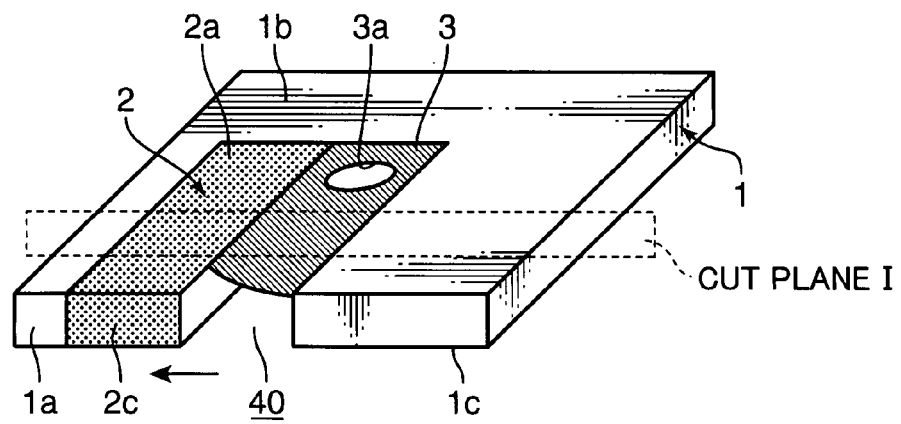
Figure 1C:
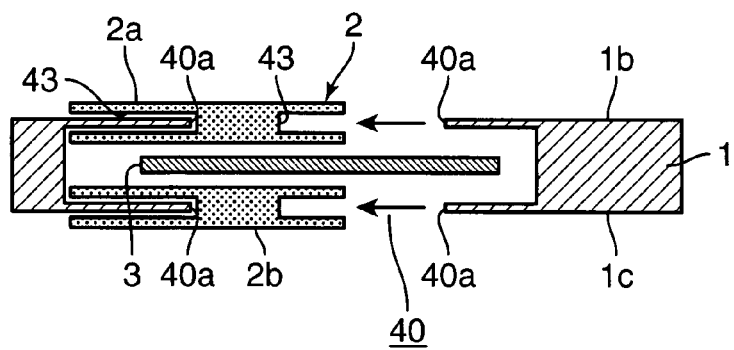

Hereinafter, a first embodiment of the present invention is described. FIGS. 1A to 1C are exterior views and a section of a disc cartridge according to the first embodiment of the present invention.

In FIGS. 1A to 1C, identified by 1 is a disc case as a housing, by 2 a shutter and by 3 a disc-shaped medium used in photo-mode recording.

The disc case 1 is configured to have a rectangular shape in plan view and a specified thickness. The disc case 1 is hollow.

The disc case 1 has an opening section 40 formed in a range extending from one side surface portion 1a to middle parts of an upper surface portion 1b and a lower surface portion 1c. This opening section 40 is formed to have a rectangular shape in plan view, and opposite edge portions 40a of the opening section 40 are parallel to each other. The opposite edge portions 40a mean the left and right edge portions in FIG. 1C and indicate a pair of edge portions facing each other and constituting the upper surface portion 1b (or a pair of edge portions facing each other and constituting the lower surface portion 1c).

The shutter 2 is attached to the disc case 1. The shutter 2 has a first lateral portion 2a corresponding to the upper surface portion 1b of the disc case 1, a second lateral portion 2b corresponding to the lower surface portion 1c of the disc case 1 and a connecting portion 2c connecting the first and second lateral portions 2a, 2b. The first and second lateral portions 2a, 2b are respectively formed to have the same rectangular shape, and arranged in parallel with the upper surface portion 1b and lower surface portion 1c of the disc case 1. The connecting portion 2c is formed to have the same width as the first and second lateral portions 2a, 2b, and arranged in parallel with the side surface portion 1a of the disc case 1.

The shutter 2 is constructed to be movable between a closing position to close the opening section 40 (see FIG. 1A) and an opening position to open the opening section 40 (see FIGS. 1B and 1C). The shutter 2 is biased from the opening position toward the closing position by a biasing member such as a spring member (not shown) or the like accommodated in the disc case 1.

Figure 2:
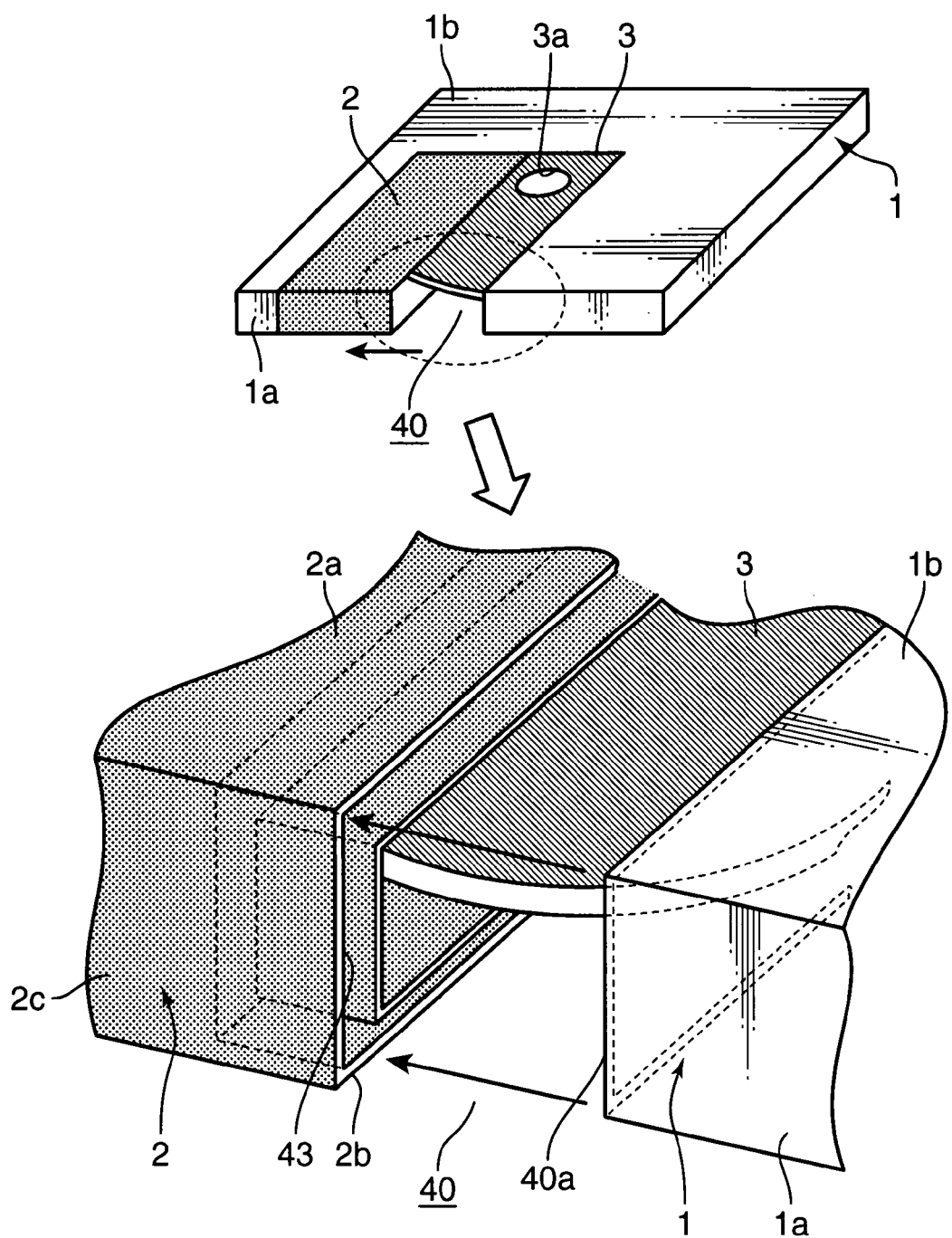
FIG. 2 is a perspective view enlargedly showing an essential portion of the disc cartridge.

The shutter 2 has shutter-side recesses 43 as an example of light path bending portions. The shutter-side recesses 43 are formed in the opposite end surfaces of the shutter 2 in a moving direction of the shutter 2. The respective shutter-side recesses 43 are recesses having rectangular cross sections, and are formed in the first lateral portion 2a, connecting portion 2c and second lateral portion 2b of the shutter 2 as shown in FIG. 2, so that any of the upper surface portion 1b, side surface portion 1a and lower surface portion 1c of the disc case 1 is insertable thereinto. Since parts of the shutter 2 are inserted in parts of the disc case 1, no optical clearance is formed between the shutter 2 and the disc case 1.

When the shutter 2 is at the closing position as shown in FIG. 1A, the medium 3 is completely light-shielded. When the shutter 2 is at the opening position as shown in FIG. 1B, a part of the medium 3 is exposed to the outside. When the shutter 2 is at the opening position, a clamp bar of an optical recording/reproducing apparatus is, for example, accessible to a recording/reproducing area of the medium 3 and a clamp hole 3a. It should be noted that FIG. 1C is a section of the disc cartridge along a cut plane I in FIG. 1B.

Figure 3:
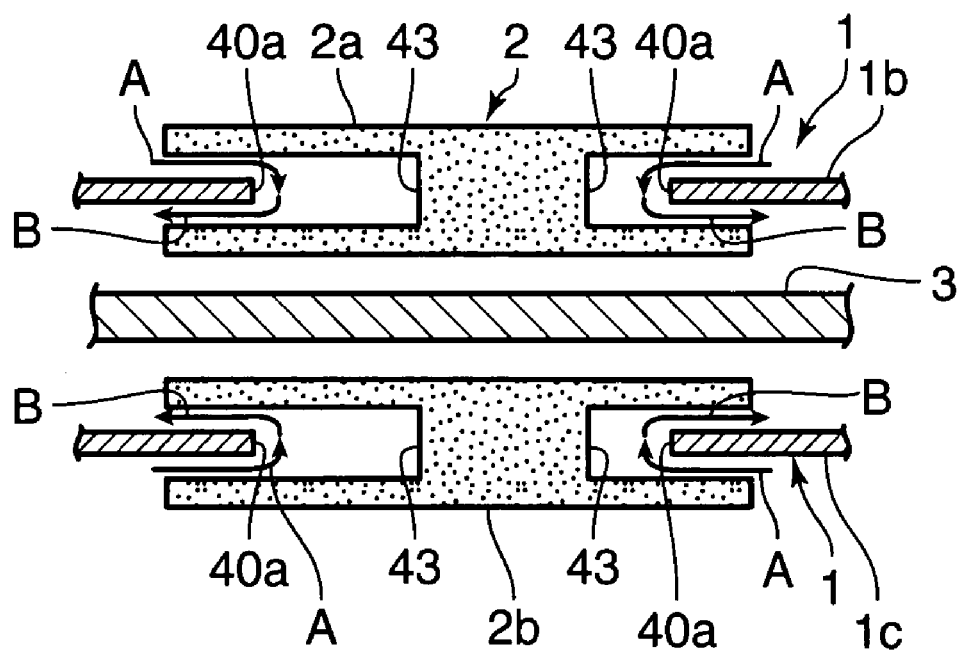
FIG. 3 is a diagram showing a path of a stray light in the disc cartridge.

In FIG. 1A, the medium 3 is accommodated in the disc case 1 and completely light-shielded by the shutter 2 at the closing position and the disc case 1. For example, as conceptually shown in FIG. 3, the edge portions 40a at the opposite sides of the opening section 40 of the disc case 1 are inserted in the shutter-side recesses 43 when the shutter 2 is at the closing position. Thus, propagation paths of stray lights are bent at two points in the clearance between the disc case 1 and shutter 2. Specifically, as shown by arrows A in FIG. 3, the stray lights propagating from the outside of the disc case 1 toward the inside of the disc case 1 pass outside and along the disc case 1 toward the back side of the shutter-side recesses 43 and are then bent inward of the disc case 1 (first point). These stray lights propagating inward of the disc case 1 are bent to propagate along the disc case 1 (second point) in the shutter-side recesses 43 as shown by arrows B in FIG. 3. The stray lights bent at two points reach the inside of the disc case 1, but the medium 3 is completely light-shielded since amounts of the stray lights are very small. Since FIG. 3 is drawn to facilitate the description, it does not necessarily dimensionally coincide with FIG. 1C.

Thus, the medium 3 can be completely light-shielded from external lights as long as the shutter 2 is not open as shown in FIG. 1B. The open state of the shutter 2 shown in FIG. 1B is realized, for example, in the optical information recording/reproducing apparatus. At this time, an external force can be applied to open or close the shutter 2, for example, by providing the optical information recording/reproducing apparatus with a shutter opening mechanism having an arm or the like.

The disc case 1 is comprised of two parts, e.g. an upper housing and a lower housing, and the medium 3 can be sealed in its accommodated state by constructing the upper and lower housings to be fittable or adherable to each other over the entire circumference of a connecting portion. By forming any one of the side surfaces of the disc case 1 by a detachable part, the medium 3 can be easily accommodated into the disc case 1. In such a case, the medium 3 can be sealed by constructing this part to be fittable into or adherable to the disc case 1 over the entire circumference.

Since the medium 3 contains a material for photon-mode recording, an operation of accommodating the medium 3 needs to be performed under the irradiation of lights in a wavelength band where the medium 3 is not substantially photosensitized or in a darkroom where complete light shielding is possible. In the case of fabricating the disc cartridge in this way, there is no likelihood of the entrance of stray lights through the aforementioned fitting portion or adhering portion. However, in order to reliably exclude the stray lights through the clearances, it is also effective to seal up the above fitting portion or adhering portion, for example, with a seal tape made of a light reflecting material or light absorbing material capable of light shielding.

The essential point of the present invention is to realize complete light shielding between the disc case 1 and shutter 2.

As descried above, the medium 3 used in optical information recording using an optical photon mode is a so-called photosensitive member in the nature of the recording method and has sensitivity to lights having wavelengths equal to or below a visible light region. Thus, if a non-recorded area of the medium 3 is photosensitized, there is a problem of fatally degrading the characteristics such as a reduction of a recordable capacity. However, as described above, the photon mode optical information recording medium such as a holographic medium actually contains a reaction inhibitor for easiness to handle. Therefore, the medium has a nonlinear photosensitive characteristic and is not photosensitized under the irradiation of low-power lights. Specifically, if an amount of light irradiated to the medium 3 is equal to or below 100 nanojoules/$cm^2$, optical characteristics are not degraded even if the light irradiation should be continued for a long time. Accordingly, the present invention aims to prevent the degradation of the characteristics of the medium caused by the entrance of stray lights equal to or above the above light irradiation amount. In the disc cartridge shown in this embodiment, for example, even under the direct sunlight, stray lights entering the inside of the disc case 1 can be remarkably attenuated and an amount of light irradiated to the medium 3 can be reduced to or below several 10 nanojoules/$cm^2$ if the shutter 2 is closed. This can eliminate a possibility of degrading the characteristics of the medium 3 due to an optical factor at least outside the optical information recording/reproducing apparatus.

Figure 4:
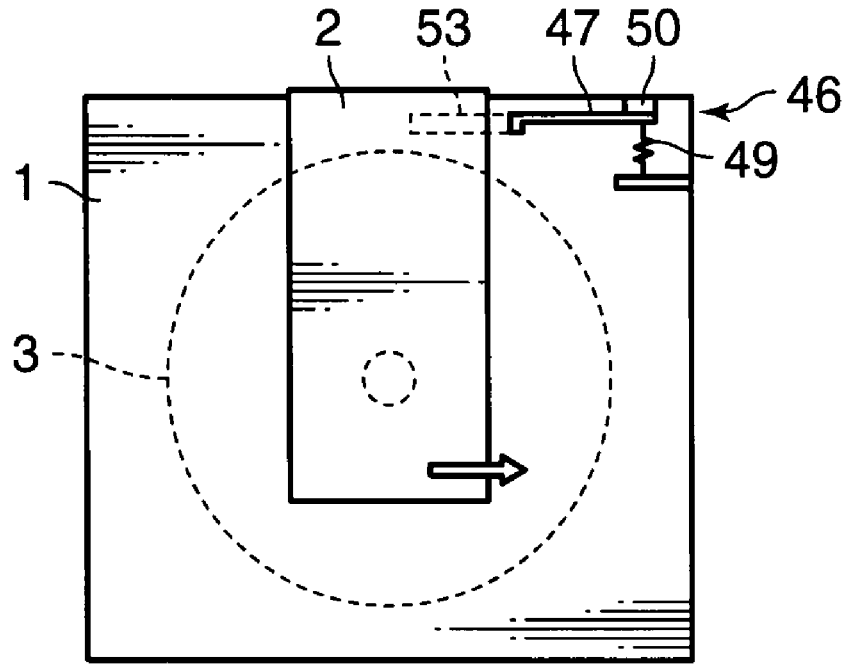
FIG. 4 is a diagram schematically showing a locking mechanism provided in the disc cartridge.
Figure 4:
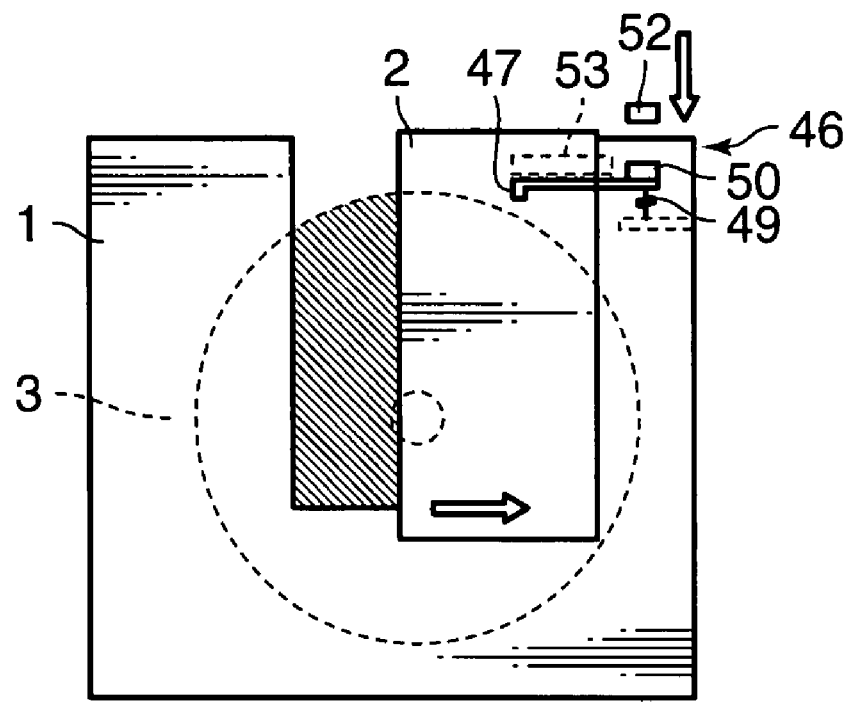

Preferably, an exposed state of the medium 3 as shown in this embodiment is, in principle, realized only in the photon mode optical information recording/reproducing apparatus. Accordingly, it is necessary that the shutter 2 for realizing the complete light shielding cannot be easily opened when the medium 3 is outside the optical information recording/reproducing apparatus. In order to accomplish this, it is possible to provide a locking mechanism in the disc case. As shown in FIG. 4, a locking member 46 is for preventing the shutter 2 from being opened outside the optical information recording/reproducing apparatus or the like and provided in the disc case 1. The locking member 46 includes a stopper 47 and a displacing mechanism for displacing this stopper 47. This displacing mechanism is comprised of a spring member 49 having the base end thereof fixed to the disc case 1 and a magnet 50 fixed to the leading end of this spring member 49. By having one end thereof fixed to the magnet 50, the stopper 47 is displaceable between a locking position and an unlocking position as the spring member 49 extends and contracts. When the stopper 47 is at the locking position, a projection 53 provided in the shutter 2 is in contact with the stopper 47, whereby the shutter 2 is locked. On the other hand, when the stopper 47 is at the unlocking position, the stopper 47 is not in contact with the projection 53 of the shutter 2, whereby the shutter 2 is unlocked. The magnet 50 is, for example, movable toward an external magnet 52 disposed in the optical information recording/reproducing apparatus. By arranging the external magnet 52 and the magnet 50 in the disc case 1 such that parts thereof having the same polarity approach each other, the spring member 49 is compressed when the disc cartridge is set in the optical information recording/reproducing apparatus. Thus, the stopper 47 at the locking position is moved to the unlocking position and the shutter 2 can be unlocked. Although FIG. 4 shows an example in which the locking position is attained when the spring member 49 is extended and the unlocking position is attained when the spring member 49 is compressed, the locking position may be attained upon the compression of the spring member 49 and the unlocking position may be attained upon the extension of the spring member 49. Further, the locking member 46 may be made accessible (for the unlocking operation) by forming a window (worked so as not to hinder the complete light shielding, e.g. by fitting a valve inside the disc case) through which, for example, a very thin needle-like pin is inserted.

As described above, since stray lights propagating in the clearances between the disc case 1 and shutter 2 are bent at least at two points by the light path bending portions in the first embodiment, it can be made difficult for the stray lights entering through the clearances to reach the medium 3 despite the presence of the clearances between the disc case 1 and shutter 2. This can make it difficult to degrade the optical characteristics of the medium 3. In addition, it can be suppressed to complicate the construction of the disc cartridge since the light path bending portions are provided in the disc case 1 or shutter 2.

In the first embodiment, the light path bending portions are formed by the shutter-side recesses formed in the shutter in which the edge portions of the opening section in the housing are inserted when the shutter is at the closing position.

Accordingly, when the shutter is at the closing position, the edge portions of the opening section in the housing are located in the shutter-side recesses. Thus, stray lights are bent at least at two points upon propagating in the clearances between the housing and shutter, wherefore it can be made difficult for the stray lights to reach the photon mode optical information recording medium. Further, the entrance of stray lights can be suppressed with a simple construction of only providing the recesses in the shutter.

Second Embodiment

Figure 5A:
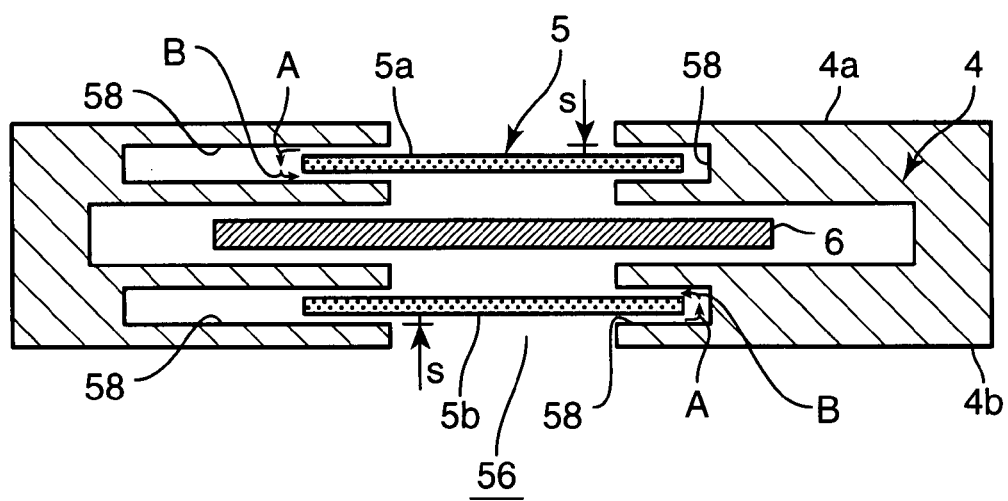
Figure 5B:
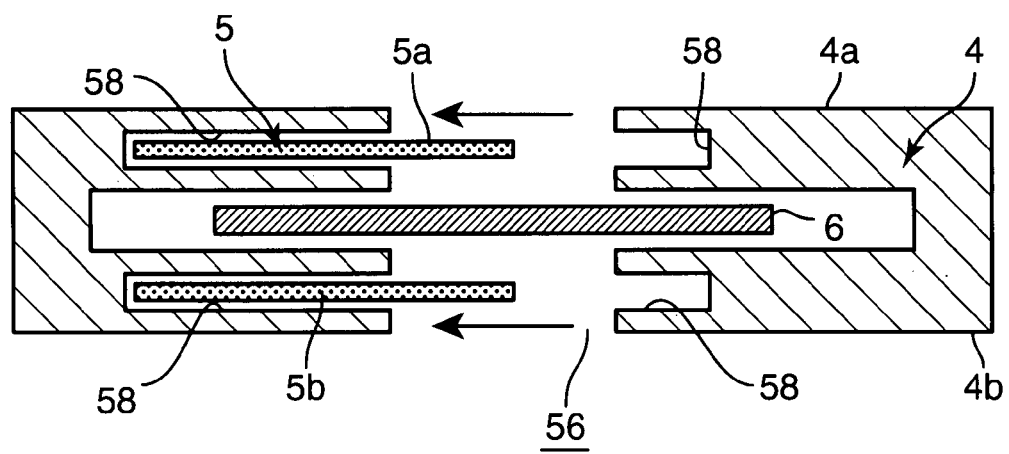

FIGS. 5A and 5B show a disc cartridge according to a second embodiment of the present invention. In FIGS. 5A and 5B, identified by 4 is a disc case as a housing, by 5 a shutter movably mounted in the disc case 4 and by 6 a disc-shaped medium used in photon mode recording. FIG. 5A is a section showing a state where the shutter 5 is closed and the medium 6 is completely light-shielded and FIG. 5B is a section showing a state where the shutter 5 is open and the medium 6 is partly exposed to the outside.

The shutter 5 has a first lateral portion 5a corresponding to an upper surface portion 4b of the disc case 4, a second lateral portion 5b corresponding to a lower surface portion 4c of the disc case 4 and a connecting portion (not shown) connecting the first and second lateral portions 5a, 5b. In the second embodiment, any of the first lateral portion 5a, second lateral portion 5b and connecting portion is in the form of a flat plate having no recesses formed at the opposite ends thereof.

Similar to the first embodiment, the disc case 4 has an opening section 56 rectangular in plan view. Housing-side recesses 58 as an example of light path bending portions are provided at edge portions of the opening section 56 in this disc case 4. The housing-side recesses 58 are formed at the opposite edge portions of the opening section 56 with respect to a moving direction of the shutter 5. The respective housing-side recesses 58 are recesses of the disc case 4 having rectangular cross sections. Thus, the inner surfaces of the housing-side recesses 58 and the shutter 5 inserted thereinto are substantially parallel to each other. The respective housing-side recesses 58 are formed in the upper surface portion 4a, side surface portion and lower surface portion 4b.

When the shutter 5 is at the closing position, the opposite ends of the shutter 5 are inserted in the housing-side recesses 58. In other words, parts of the shutter 5 are inserted in parts of the disc case 4. Thus, stray lights propagating in clearances between the disc case 4 and the shutter 5 are bent at two points. Specifically, as shown by arrows A in FIG. 5A, the stray lights propagating from the outside of the disc case 4 toward the inside of the disc case 4 pass outside the shutter 5 toward the back sides of the housing-side recesses 58 and are then bent inward of the disc case 4 (first point). These stray lights propagating inward of the disc case 4 are bent to propagate along the shutter 5 in the housing-side recesses 58 (second point) as shown by arrows B in FIG. 5A. Since the stray lights are bent at two points before reaching the medium 6, an amount of light reaching the medium 6 is remarkably reduced, whereby the medium 6 can be completely light-shielded. When the shutter 5 is opened, the rear end (left end in FIG. 5A) of the shutter 5 move toward the back sides of the housing-side recesses 58 at the shown left side, whereas the front end (right end in FIG. 5A) of the shutter 5 comes out of the housing-side recesses 58 at the shown right side.

According to our examination, lights can be effectively completely shielded by setting widths S of the clearances between the disc case 4 and shutter 5 to or below 200 μm. By setting the widths S of the clearances to or above 100 μm, smooth opening and closing movements of the shutter 5 can be ensured.

Figure 6A:
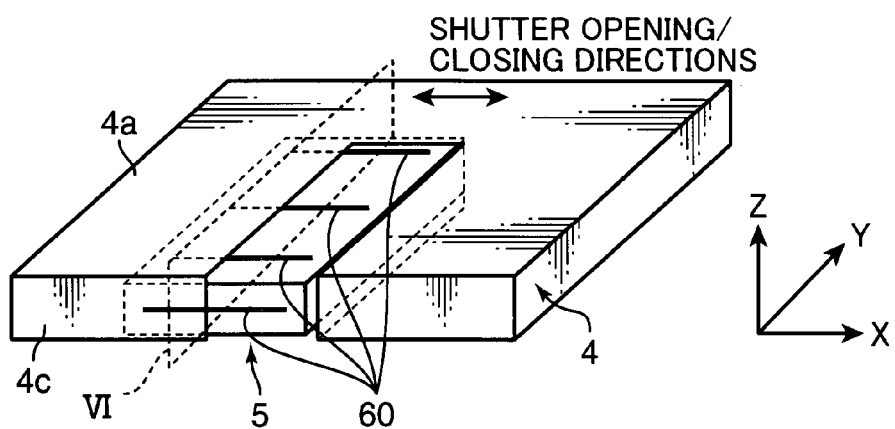
FIGS. 6A and 6B are a perspective view and a section in the case where a spacer is provided in the disc cartridge.
Figure 6B:
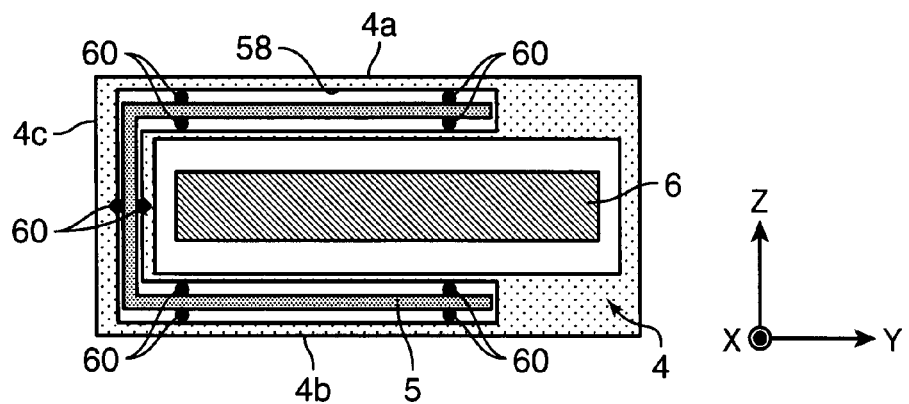

In order to stabilize the widths S of the clearances, it is possible to arrange spacers 60 between the disc case 4 and shutter 5, for example, as shown in FIGS. 6A and 6B. The spacers 60 may be fixed to the disc case 4 or shutter 5. The spacers 60 may be configured to have a narrow shape extending in the moving direction of the shutter 5. The spacers 60 are arranged in the housing-side recesses 58 located in the upper surface portion 4a, lower surface portion 4b and side surface portion 4c of the disc case 4 and function as guides for the shutter 5. In this way, a light-shielding effect can be ensured and smooth opening and closing movements of the shutter 5 can be realized. By adopting a disc cartridge construction shown in this example, even under the direct sunlight, stray lights entering the inside of the disc case 4 can be remarkably attenuated and an amount of lights irradiated to the medium 6 can be reduced to or below 10 nanojoules/cm$^2$ if the shutter 5 is closed. This can eliminate a possibility of degrading characteristics of the medium 6 due to an optical factor at least outside the optical information recording/reproducing apparatus.

Figure 7:
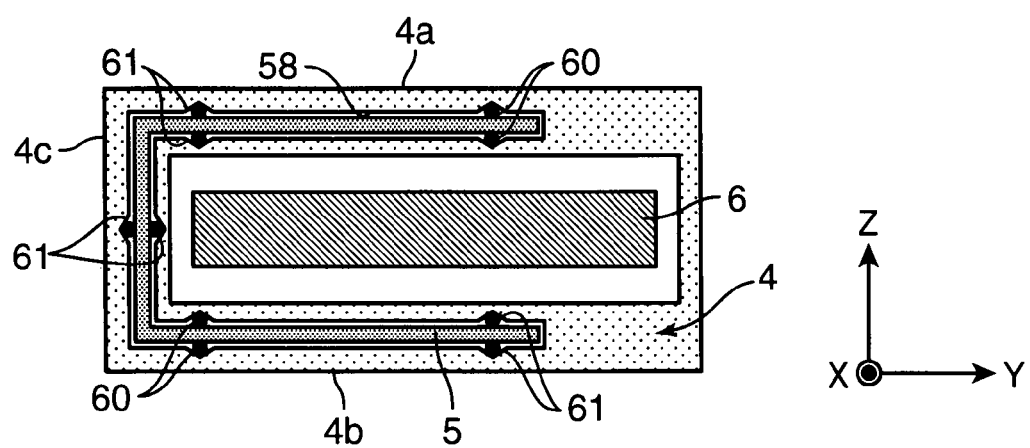
FIG. 7 is a section in the case where guide grooves are further provided in the disc cartridge.

Further, as shown in FIG. 7, guide grooves 61 for holding the spacers 60 may be formed in the housing-side recesses 58. These guide grooves 61 are formed in the inner surfaces of the housing-side recesses 58 and extend in the opening and closing directions of the shutter 5. The spacers 60 are held by being disposed in these guide grooves 61.

As described above, in the second embodiment, the light path bending portions are formed by the housing-side recesses formed at the edge portions of the opening section in the housing so that the shutter at the closing position is located therein.

Accordingly, when being at the closing position, the shutter is located inside the housing-side recesses. Thus, stray lights are bent at least at two points upon propagating in the clearances between the disc case and shutter, wherefore it can be made difficult for the stray lights to reach the photon mode optical information recording medium. Further, the entrance of stray lights can be suppressed with a simple construction of only providing the recesses in the housing.

Further, the clearances of the housing and shutter are set equal to or larger than 100 μm and equal to or smaller than 200 μm in the second embodiment.

In this embodiment, smooth opening and closing movements of the shutter can be ensured by setting the clearances to or above 100 μm, and the entrance of stray lights can be effectively suppressed by setting the clearances to or below 200 μm.

Figure 8:
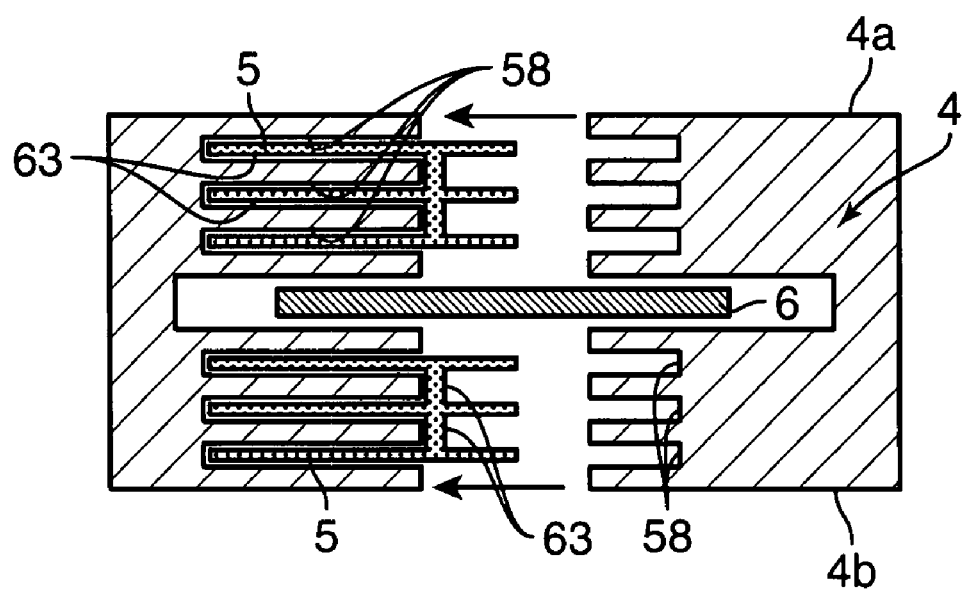
FIG. 8 is a section showing a disc cartridge as another example of the second embodiment of the invention.

Although each of the housing-side recesses 58 at the opposite sides is formed to be one recess and the shutter 5 is formed by one plate material in this example, the disc case 4 and shutter 5 may be constructed to be engaged with each other at a plurality of positions to provide a plurality of overlapping portions of the disc case 4 and shutter 5, for example, as shown in FIG. 8. In this construction, the light path bending portions include shutter-side recesses 63 provided in the shutter 5 and housing-side recesses 58 provided in the disc case 4. In the shown example, two shutter-side recesses 63 are provided in the thickness direction of the shutter 5 and three housing-side recesses 58 are provided in the thickness direction of the shutter 5. When the shutter 5 is at the closing position, the opposite ends of the shutter 5 are located in the housing-side recesses 58 and the edge portions of the opening section in the disc case 4 are located in the shutter-side recesses 63. Thus, stray lights propagating in the clearances between the disc case 4 and shutter 5 are bent at ten points.

In this mode, the light path bending portions include a plurality of shutter-side recesses formed in the shutter and a plurality of housing-side recesses formed in the edge portions of the opening section in the housing and, when the shutter is at the closing position, the edge portions of the opening section in the housing are located in the respective shutter-side recesses and the shutter at the closing position is located in the respective housing-side recesses.

Accordingly, the number of times stray lights propagating the clearances between the housing and shutter are bent can be increased. Therefore, the entrance of stray lights can be effectively reduced.

The other construction, functions and effects are similar to those of the first embodiment.

Third Embodiment

Figure 9A:
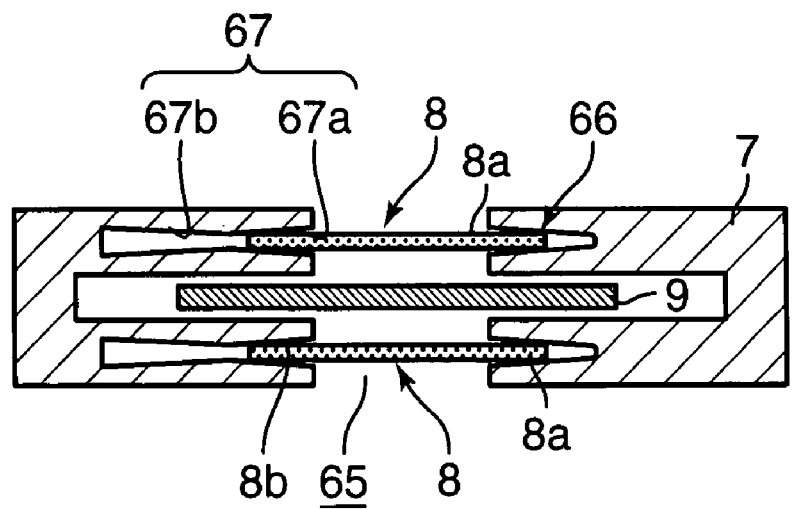
Figure 9B:
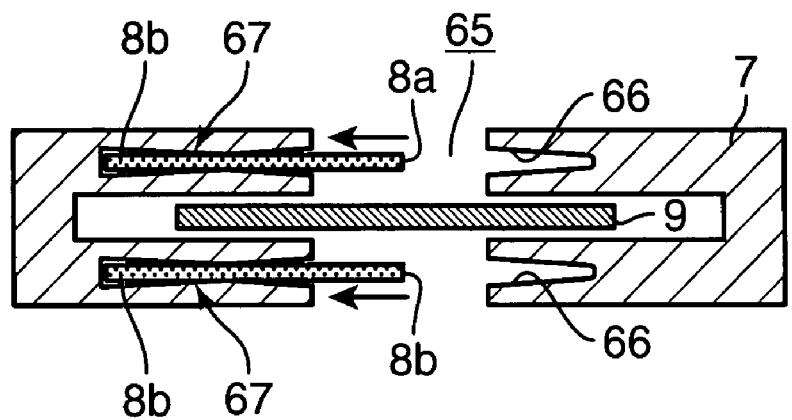

FIGS. 9A and 9B show a disc cartridge according to a third embodiment of the present invention. In the third embodiment, housing-side recesses are tapered.

In FIGS. 9A and 9B, identified by 7 a disc case, by 8 a shutter movably mounted in the disc case 7 and by 9 is a disc-shaped medium used in photon mode recording. FIG. 9A is a section showing a state where the shutter 8 is closed and the medium 9 is completely light-shielded, and FIG. 9B is a section showing a state where the shutter 8 is open and the medium 9 is partly exposed to the outside.

In the third embodiment, light path bending portions are formed by housing-side recesses formed in the opposite edge portions of an opening section 65. A housing-side recess (hereinafter, "shielding-side groove") 66 shown at the right side is a groove into which a front end portion 8a of the shutter 8 is inserted when the shutter 8 is closed. This shielding-side groove 66 is a tapered recess whose width is narrowed toward the back side. The width mentioned here means a dimension in the thickness direction of the shutter. The shutter 8 and disc case 7 are in contact in the shielding groove 66.

On the other hand, the housing-side recess (hereinafter, "accommodating-side groove 67") shown at the left side has a rear end portion 8b of the shutter 8 located therein regardless of whether the shutter 8 is at the closing position or at the opening position. The accommodating-side groove 67 is comprised of an introducing portion 67a tapered to narrow its width toward the back side, and an accommodating-side recess 67b communicating with the back side of the introducing portion 67a. The width mentioned here means a dimension in the thickness direction of the shutter. This accommodating-side recess 67b is formed to gradually widen its width from the backmost end of the introducing portion 67a. The disc case 7 and shutter 8 are closest at the backmost end of the introducing portion 67a.

In the third embodiment, parts of the shutter 8 are inserted in parts of the disc case 7, and the housing-side recesses 66, 67 are tapered along a moving direction of the shutter 8. The shielding-side groove 66 is narrowed in its width as it extends away from the opening section 65 of the disc case 7, and preferably has a part whose width is smaller than the thickness of the shutter 8. By this construction, the shutter 8 and disc case 7 come into contact with each other when the shutter 8 is closed, wherefore the entrance of stray lights through the shielding-side groove 66 can be effectively prevented.

On the other hand, the contact of the shutter 8 and disc case 7 in the accommodating groove 67 is not preferable in order to smooth opening and closing movements of the shutter 8. Accordingly, it is preferable to leave a clearance between the shutter 8 and disc case 7. If the minimum width of this clearance, i.e. the width of the clearance at the backmost end of the introducing portion 67a is 100 μm or larger, the shutter 8 can be smoothly moved. Further, by avoiding the collision of the shutter 8 with the disc case 7 as a result of movements of the shutter 8, dust production can be prevented. On the other hand, there still remains a small possibility of the entrance of stray lights through the accommodating groove 67. Such stray lights entering the disc case 7 through the accommodating groove 67 can be reduced by setting the minimum width of the clearance between the disc case 7 and shutter 8, for example, to 200 μm or below.

Generally, in the tapered construction, a light having entered from a wider side toward a narrower side of a clearance propagates while being repeatedly reflected by the tapered wall surface many times. At this time, an incident angle on the wall surface gradually increases as the light propagates toward the narrower side of the clearance defined by the wall surface, and the number of reflection by the wall surface also increases. Thus, the light having entered is attenuated by being scattered or absorbed every time being reflected, wherefore there is an effect that the light hardly reaches the back side (narrower side of the clearance) of the tapered construction. For this reason, it can be understood that the construction of the tapered housing-side recesses 66, 67 as shown in this example is effective in completely light-shielding the medium 9. By adopting such a construction, even under the direct sunlight, stray lights entering the inside of the disc case 7 can be remarkably attenuated and an amount of lights irradiated to the medium 9 can be reduced to or below 10 nanojoules/cm$^2$ if the shutter 8 is closed. This can eliminate a possibility of degrading characteristics of the medium 9 due to an optical factor at least outside the optical information recording/reproducing apparatus. The shutter 8 and disc case 7 are preferably made of such a material as to absorb stray lights. In such a case, the attenuation of the stray light in the disc case 7 and shutter 8 for each reflection can be increased, wherefore a light shielding effect can be further increased. Here, a material obtained by mixing carbon or the like into a so-called plastic material such as polycarbonate, acrylic or vinyl chloride so as to be opaque or capable of light absorption in a visible light region can be cited as an example of such a material as to absorb stray lights.

As described above, the housing-side recess is tapered to gradually narrow its width in this embodiment.

Accordingly, the entrance of stray lights can be made more difficult since the clearance is narrowed along a propagation direction of the stray lights. Thus, the depth of the housing-side recess can be suppressed as compared to the case where the housing-side recess is formed to be parallel. Therefore, the enlargement of the housing can be prevented. Further, the management of the clearance width between the housing and shutter can be moderated, thereby making it easier to produce the disc cartridge.

The housing and shutter is preferably made of a light absorbing material. In this mode, the transmission of stray lights through the housing and shutter can be suppressed, therefore making it more difficult to degrade the optical characteristics of the photon mode optical information recording medium.

Although the width of the accommodating-side recess 67b is shown to be widened toward the back side in FIGS. 9A and 9B, the present invention is not limited thereto. In short, similar effects can be obtained if such a clearance as not to hinder opening and closing movements of the shutter 8 is ensured.

Further, the present invention is not limited to the case where both the shielding-side groove 66 and the accommodating-side groove 67 are tapered. For example, one of them may be parallel. However, if one side is formed to be parallel, this groove needs to have a larger depth. Thus, for the miniaturization of the disc cartridge, the housing-side recesses 66, 67 are preferably tapered.

Figure 10:
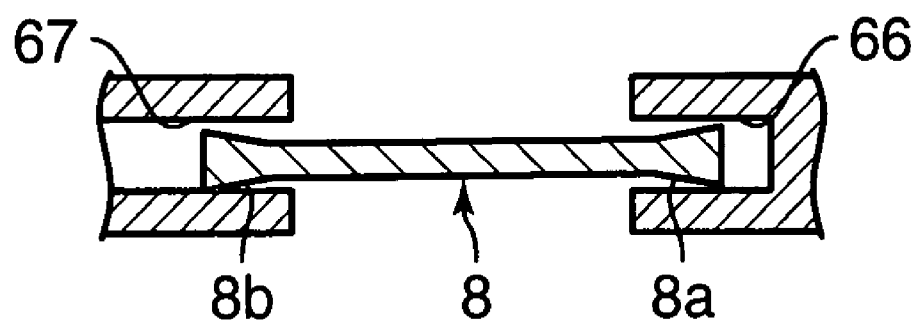
FIG. 10 is a section showing a disc cartridge as another example of the third embodiment of the invention.

As shown in FIG. 10, the opposite end portions 8a, 8b of the shutter 8 may be tapered and the shielding-side groove 66 and introducing portion 67a may be formed to be parallel. In this case as well, clearances between the disc case 7 and shutter 8 are tapered.

Although the housing-side recesses 66, 67 are tapered in the third embodiment, the shutter-side recesses 43 may be tapered in the first embodiment.

The other construction, functions and effects are similar to those of the second embodiment.

Fourth Embodiment

Figure 11A:
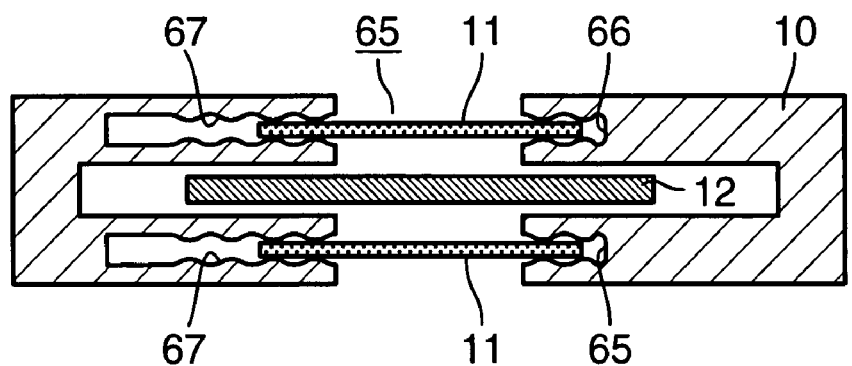
Figure 11B:
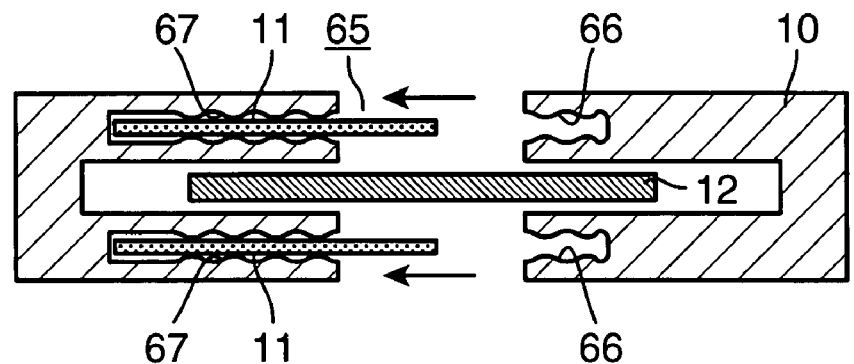

FIGS. 11A and 11B show a disc cartridge according to a fourth embodiment of the present invention. In the fourth embodiment, housing-side recesses have a wavy construction. With this construction as well, effects similar to those of the above tapered construction can be obtained.

FIGS. 11A and 11B show an example in the case where a medium is light-shielded by a disc case having wavy constructions at its parts for holding a shutter. In FIGS. 11A and 11B, identified by 10 is a disc case, by 11 a shutter movably mounted in the disc case 10 and by 12 is a disc-shaped medium used in photon mode recording. FIG. 11A is a section showing a state where the shutter 10 is closed and the medium 12 is completely light-shielded, and FIG. 11B is a section showing a state where the shutter 11 is open and a part of the medium 12 is exposed to the outside.

In the fourth embodiment, side walls of housing-side recesses (shielding-side groove 66 and accommodating-side groove 67) formed in the opposite edge portions of an opening section 65 are formed to have wavy shapes along a moving direction of the shutter 11. A part of the disc case 10 is inserted into the housing-side recesses 66, 67 to hold a part of the shutter 11 by the disc case 10.

Here, for smooth opening and closing movements of the shutter 11, the contact of the shutter 11 and the side walls of the housing-side recesses 66, 67 within the movable range of the shutter 11 is not preferable. Accordingly, it is preferable to leave clearances between the shutter 11 and the disc case 10. If the minimum width of these clearances is set to or above 100 μm, the shutter 11 can be smoothly moved. Further, by avoiding the collision of the shutter 11 with the disc case 10 as a result of movements of the shutter 11, dust production can be prevented. On the other hand, there still remains a small possibility of the entrance of stray lights through the housing-side recesses 66, 67, but such stray lights entering the disc case 10 through the housing-side recesses 66, 67 can be reduced by setting the minimum width of the clearances between the disc case 10 and shutter 11, for example, to 200 µm or below. This is because the shape of the space to the shutter 11 is substantially tapered by adopting one wavy configuration.

By adopting the disc cartridge construction shown in this example, even under the direct sunlight, stray lights entering the inside of the disc case 10 can be remarkably attenuated and an amount of light irradiated to the medium 12 can be reduced to or below 10 nanojoules/cm$^2$ if the shutter 11 is closed. This can eliminate a possibility of degrading characteristics of the medium 12 due to an optical factor at least outside the optical information recording/reproducing apparatus.

As described above, the housing-side recesses are formed to have wavy shapes in which widened parts and narrowed parts alternately repeat in the fourth embodiment.

Since stray lights are difficult to pass the narrowed parts of the housing-side recesses, the entrance of the stray lights can be made more difficult by having a plurality of narrowed parts in the housing-side recesses according to this mode. Thus, the management of the clearances between the housing and the shutter can be moderated, thereby making it easier to produce the disc cartridge.

The attenuation rate of stray lights can be set by selecting the taper angle and taper length in the aforementioned tapered groove construction. In the wavy groove construction of this example as well, the attenuation rate of stray lights can be set by selecting a wave period (or wavelength in a direction parallel to the moving direction of the shutter 11) and amplitude (change of the spacing to the shutter 11). In a case of making the shutter 11 and disc case 10 of such a material as to absorb stray lights, the attenuation of the stray light in the disc case 10 and shutter 11 for each reflection can be increased, wherefore a light shielding effect can be further increased.

Although the housing-side recesses 66, 67 are formed to have wavy shapes in the fourth embodiment, the shutter-side recesses 43 may be formed to have wavy shapes in the first embodiment.

The other construction, functions and effects are similar to those of the third embodiment.

Fifth Embodiment

Figure 12:
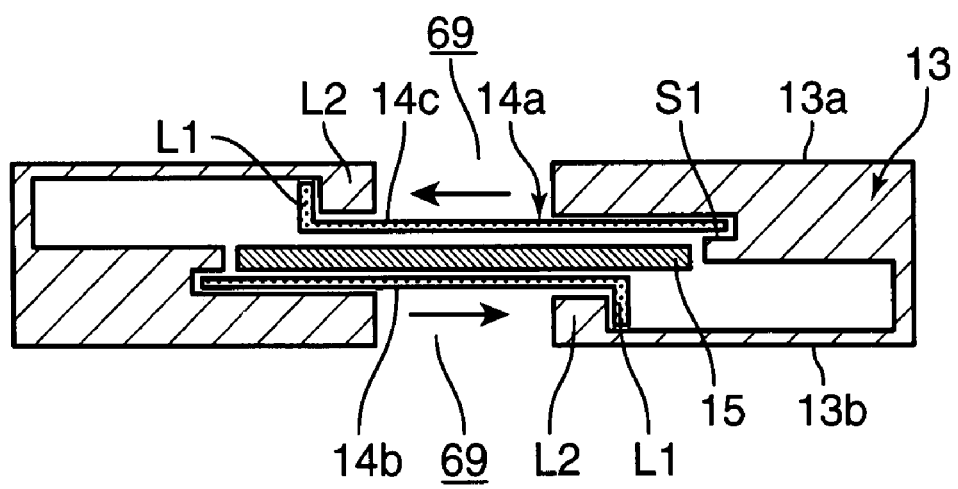
FIG. 12 is a section of a disc cartridge according to a fifth embodiment of the invention.

FIG. 12 shows a disc cartridge according to a fifth embodiment of the present invention. In this embodiment, a shutter and a disc case are provided with wall structures for light shielding.

In FIG. 12, identified by 13 is a disc case, by 14a, 14b shutters movably mounted in the disc case 13 and by 15 a disc-shaped medium used in photon mode recording. Here, FIG. 12 is a section showing a state where the shutters 14a, 14b are closed and the medium 15 is completely light-shielded.

The shutter is comprised of the first shutter 14a and the second shutter 14b. These first and second shutters 14a, 14b are separate parts. The first shutter 14a is arranged between an upper surface portion 13a of the disc case 13 and the medium 15, and the second shutter 14b is arranged between a lower surface portion 13b of the disc case 13 and the medium 15.

Opening sections 69 of the disc case 13 are not formed in a side surface portion unlike the first embodiment, and independently formed in the upper and lower surface portions 13a, 13b. Specifically, the disc case 13 is formed with the upper opening section 69 in the upper surface portion 13a and the lower opening section 60 in the lower surface portion 13b. The first and second shutters 14a, 14b are movable in opposite directions. Each of the first and second shutters 14a, 14b is formed by bending a flat plate material.

It should be noted that the opening section 69 of the disc case 13 may be formed with a side surface portion as in the first embodiment. In this case, a part of the first shutter 14a may cover the opening section 69 formed in the side surface portion and a part of the second shutter 14b may be placed on the first shutter 14a.

In the fifth embodiment, light path bending portions are formed by shutter-side projections L1 and housing-side projections L2. Each shutter-side projection L1 is formed by bending one end (rear end) of the shutter 14a, 14b with respect to a moving direction. The shutters 14a, 14b are arranged at such positions that the shutter-side projections L1 are located at ends of shutter closing directions. Each shutter-side projection L1 is bent to extend from a shutter main body 14c arranged in parallel with the medium 15 in a direction toward a side opposite to the medium 15.

The housing-side projections L2 are provided at the upper and lower surface portions 13a, 13b of the disc case 13. The respective housing-side projections L2 are formed at such positions as to face the shutter-side projections L1 in the closing directions of the shutters 14a, 14b.

A hollow part in the disc case 13 is dimensioned such that the shutter-side projections L1 are movable in the shutter opening and closing directions. The disc case 13 is formed with the housing-side projections L2 by causing the edge portions of the opening sections 69 to project toward the medium 15. Thus, the vicinities of the opening sections 69 are made sufficiently narrower than the height of the shutter-side projections L1, and the housing-side projections L2 are present in the shutter closing directions of the shutter-side projections L1. Therefore, the shutter-side projections L1 are constantly located in the disc case 13.

Figure 13:
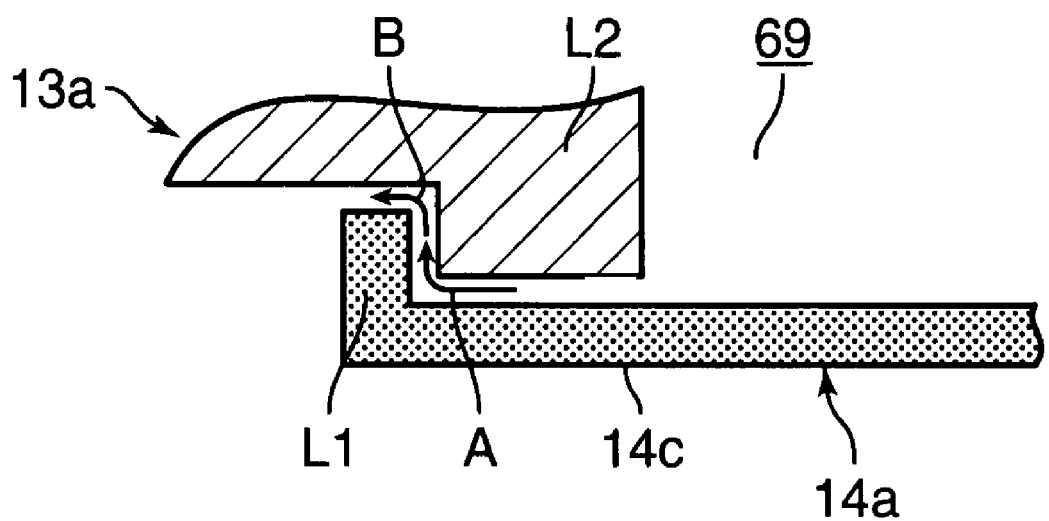
FIG. 13 is a diagram showing a path of a stray light in the disc cartridge.

With the shutters 14a, 14b closed, spatial clearances are eliminated by the proximate arrangement or contact of the shutter-side projections L1 and housing-side projections L2, whereby a light-shielding effect can be obtained. Even if clearances are formed between the shutter-side projections L1 and housing-side projections L2, complete light shielding can be realized since stray lights propagating in the clearances are bent at two points. Specifically, as shown in an arrow A in FIG. 13, the stray light propagating in the clearance is, for example, bent along the shutter-side projection L1 after propagating the clearance between the shutter main body 14c of the first shutter 14a and the housing-side projection L2 (first point). Then, as shown by an arrow B in FIG. 13, this stray light is bent at the leading end of the shutter-side projection L1 after propagating upward (second point). Since the stray light is bent at two points before reaching the medium 15, an amount of light reaching the medium 15 is remarkably reduced, whereby the medium 15 is completely light-shielded.

If opening and closing movements of the shutters 14a, 14b are considered, the shutter-side projections L1 can be formed only at the rear ends of the shutters 14a, 14b as shown in FIG. 12. Accordingly, at the front end sides of the shutters 14a, 14b, it is effective to form housing-side recesses S1 as light path bending portions in the disc case 13. When the shutters 14a, 14b are at the closing positions, the front ends of the shutters 14a, 14b are inserted into these housing-side recesses S1. Thus, the shutter 14 can be held in the disc case 13. Therefore, the complete shielding of the medium 15 can be realized. In this case, the widths of the clearances between the shutters 14a, 14b and the disc case 13 are preferably set, for example, to about 100 to 200 μm.

As described above, in the fifth embodiment, the light path bending portions are formed by the shutter-side projections formed by bending the ends of the shutter and the housing-side projections formed at the housing to face the shutter-side projections.

Since stray lights are bent at two points along the housing-side projections and shutter-side projections in this mode, it can be made difficult for the stray lights to reach a photon mode optical information recording medium. In addition, it can be suppressed to complicate the constructions of the shutter and housing.

Although the shutter is comprised of the first and second shutters 14a, 14b as separate parts in the fifth embodiment, the present invention is not limited thereto. For example, the shutters may be integrally formed as in the first embodiment. In such a case, the shutters cannot be moved in opposite directions unlike the fifth embodiment. Therefore, the upper and lower shutter-side projections L1 are respectively provided at the same side (e.g. left side in FIG. 12). In this case, the upper and lower housing-side projections L2 are also provided at the same sides of the opening sections 69. Accordingly, in this case, the size of the shutter-side projections L1 largely influences the thickness of the disc cartridge, which might lead to an increase in the entire thickness of the disc cartridge. Therefore, the shutters 14a, 14b are preferably constructed to independently open in opposite directions at the upper and lower sides of the disc case 13 as in the fifth embodiment. This can suppress an increase in the thickness of the disc case 13.

The other construction, functions and effects are similar to those of the first embodiment.

Sixth Embodiment

Figure 14A:
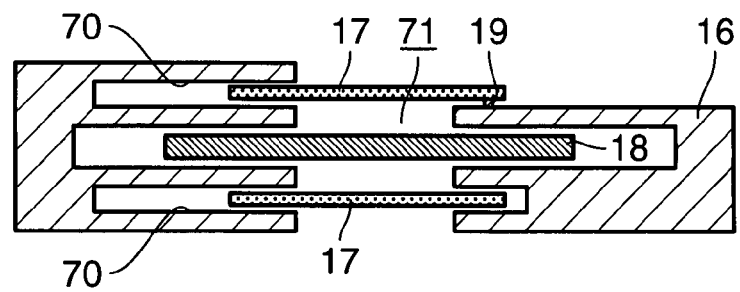
Figure 14B:
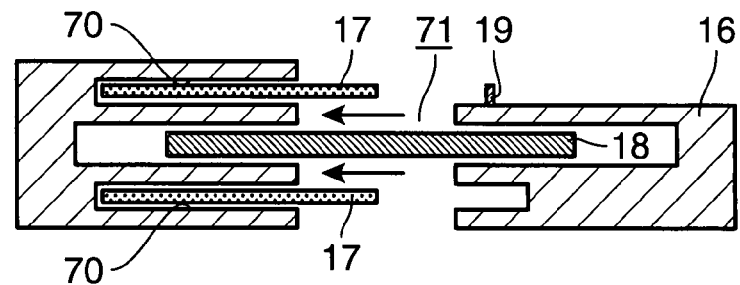

FIGS. 14A and 14B show a disc cartridge according to a sixth embodiment of the present invention.

In FIGS. 14A and 14B, identified by 16 is a disc case, by 17 a shutter movably mounted in the disc case 16, by 18 a disc-shaped medium used in photon mode recording and by 19 a skirt portion as an example of an elastic member. FIG. 14A is a section showing a state where the shutter 17 is closed and the medium 18 is completely light-shielded, and FIG. 14B is a section showing a state where the shutter 17 is open and the medium 18 is partly exposed to the outside.

In the sixth embodiment, light path bending portions are formed by a housing-side recess 70 formed in the disc case 16. A rear end portion of the shutter 17 at a closing position is located in this housing-side recess 70, and is inserted toward the back side of the housing-side recess 70 as the shutter 17 is opened.

The skirt portion 19 is made of an elastic material such as rubber, and fixed to the outer surface of an upper surface portion of the disc case 16 near an opening section 71. When the shutter 17 is at the closing position as shown in FIG. 14A, the skirt portion 19 made of an elastic member and the shutter 17 can be held in contact without defining any clearance therebetween. Specifically, the skirt portion 19 is inclined in a moving direction of the shutter 17 by a force closing the shutter 17. Since the shutter 17 is biased in a closing direction, a biasing force of the shutter 17 and an elastic force of the skirt portion 19 act against each other while the shutter 17 is closed. Accordingly, the shutter 17 is held at the closing position and the shutter 17 and the skirt portion 19 are kept in close contact, whereby complete light shielding can be maintained. Since the skirt portion 19 is arranged near the opening section 71 at the front end side of the shutter 17, the shutter 17 is separated from the skirt portion 19 while being opened as shown in FIG. 14B. Therefore, the skirt portion 19 returns to its original stable shape due to its elasticity.

As described above, in the sixth embodiment, one end portion of the shutter at the closing position is insertable into the housing-side recess, and the housing is provided with the elastic member with which the other end portion of the shutter at the closing position is held in close contact.

In this mode, the entrance of stray lights propagating in the clearances between the shutter and the housing-side recess can be suppressed at the one end side of the shutter, whereas the entrance of stray lights can be suppressed by the close contact of the shutter with the elastic member at the other end side of the shutter.

Figure 15A:
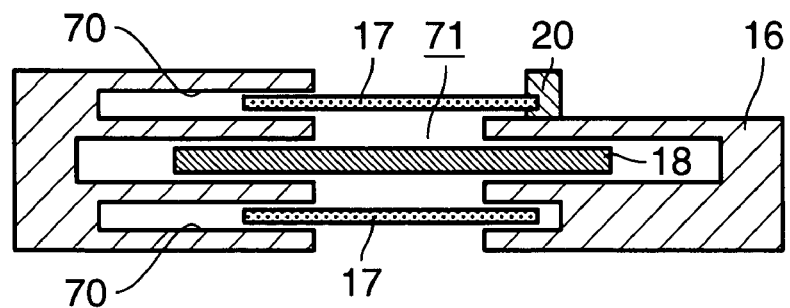
Figure 15B:
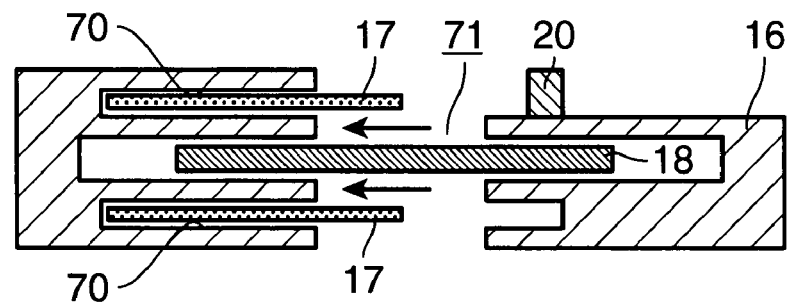

As shown in FIGS. 15A and 15B, the elastic member may be a stopper 20 made of an elastic material as an example of an elastic structural element. Similar to the skirt portion 19, this stopper 20 is fixed to an outer surface of the disc case 16. The stopper 20 is arranged at such a position that the front end of the shutter 17 bites in a side surface of the stopper 20 when the shutter 17 is closed. Accordingly, when the shutter 17 is at the closing position, the shutter 17 bites in the side surface of the stopper 20, whereby the shutter 17 and the stopper 20 are held in close contact. At this time, a biasing force acting in the closing direction of the shutter 17 and an elastic force of the stopper 20 act against each other. Accordingly, the shutter 17 and the stopper 20 can be kept in close contact and complete light shielding can be maintained.

The other construction, functions and effects are similar to those of the first embodiment.

Seventh Embodiment

Figure 16A:
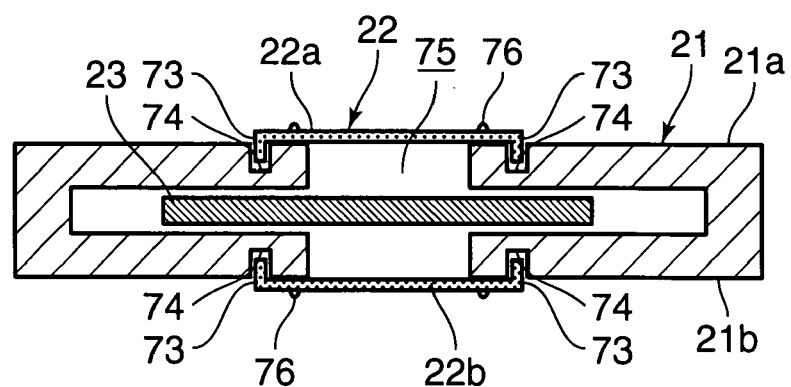
Figure 16B:
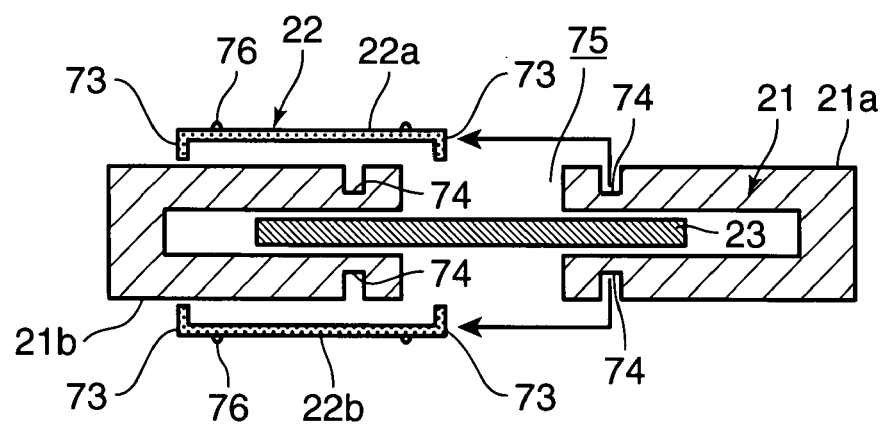

FIGS. 16A and 16B show a disc cartridge according to a seventh embodiment of the present invention. The seventh embodiment is one example of the case in which a medium is light-shielded by providing wall structures for light shielding at parts of a shutter and forming grooves engageable with these wall structures in a disc case.

In FIGS. 16A and 16B, identified by 21 is a disc case, by 22 a shutter movably mounted in the disc case 21 and by 23 a disc-shaped medium used in photon mode recording. FIG. 16A is a section showing a state where the shutter 22 is closed and the medium 23 is completely light-shielded, and FIG. 16B is a section showing a state where the shutter 22 is open and the medium 23 is partly exposed to the outside.

In the seventh embodiment, light path bending portions are formed by shutter-side projections 73 and housing-side recesses 74. The shutter-side projections 73 are provided at the front and rear ends of the shutter 22, and formed by bending ends of the shutter 22 with respect to its moving directions toward the disc case 21 (inward).

The housing-side recesses 74 are formed in the outer surfaces of an upper surface portion 21a and a lower surface portion 21b of the disc case 21. In each of the upper and lower surface portions 21a, 21b, the housing-side recesses 74 are formed at the opposite sides of an opening section 75 with respect to the moving directions of the shutter 22.

The respective housing-side recesses 74 are formed to extend in a direction normal to the moving directions of the shutter 22 and to have a slightly larger rectangular cross section than the shutter-side projections 73. The housing-side recesses 74 are arranged at such positions as to face the shutter-side projections 73 when the shutter 22 is at the closing position.

Figure 17A:
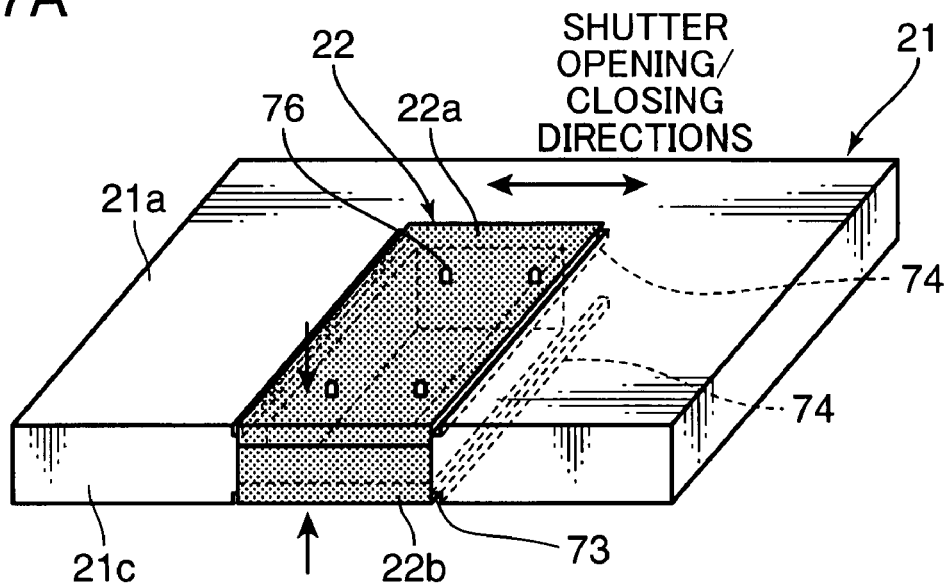
Figure 17B:
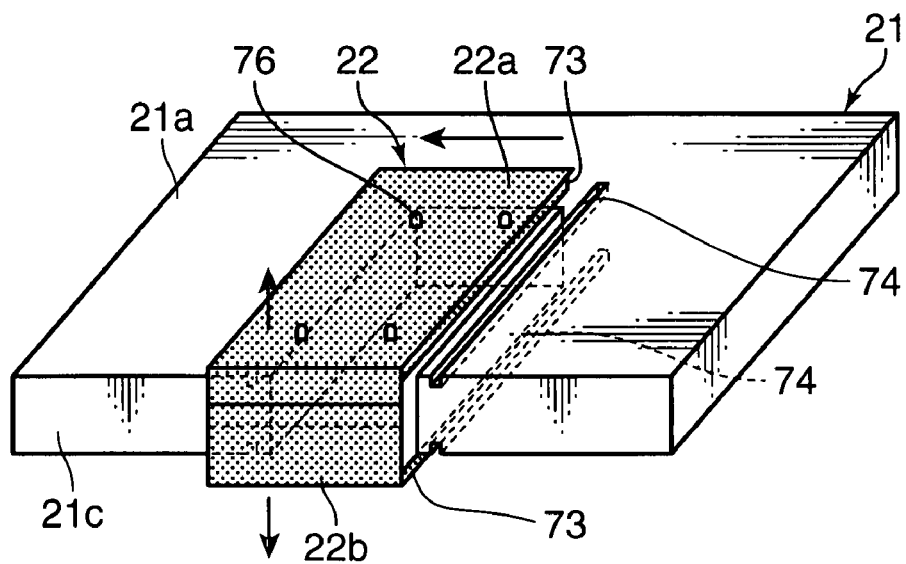

The shutter 22 is comprised of a first member 22a and a second member 22b. As shown in FIGS. 17A and 17B, the first member 22a is a plate member having an L-shaped vertical section and is arranged from the upper surface portion 21a to a side surface portion 21c of the disc case 21. The second member 22b is a plate member having an L-shaped vertical section and is arranged from the lower surface portion 21b to the side surface portion 21c of the disc case 21. The first member 22a and second member 22b are placed one over the other on the side surface portion 21c of the disc case 21. By the shutter 22 having such a construction, the shutter-side projections 73 are displaceable between inserted positions where they are inserted in the housing-side recesses 74 and separated positions where they are separated from the housing-side recesses 74. The shutter-side projections 73 are arranged at the outer side of the disc case 21 and the separated positions are located more outward than the inserted positions.

The first member 22a and second member 22b are preferably pulled toward the inner side of the disc case 23 using biasing means such as unillustrated springs. The first member 22a and second member 22b may include, for example, protuberances 76 in order to be displaced outward along the thickness direction of the disc case 21 against biasing forces of the biasing means. Then, the shutter-side projections 73 can be easily moved from the inserted positions to the separated positions utilizing these protuberances 76. It should be noted that the protuberances 76 may have any shape such as a ring shape, hook shape or column shape. The shutter 22 can be distanced from the disc case 21 by holding or hooking these protuberances 76 by means of special members such as members in the optical information recording/reproducing apparatus. However, the protuberances 76 preferably have a minimum possible projecting distance so as not to impair the shutter function. In other words, it is necessary to prevent the shutter from being opened by human hands. Instead of the protuberances 76, the first member 22a and second member 22b may be formed with grooves, and the shutter 22 may be distanced utilizing these grooves.

In the seventh embodiment, the shutter 22 cannot be easily opened due to the meshing engagement or strong contact of the shutter-side projections 73 and housing-side recesses 74 if the shutter 22 is closed outside the optical information recording/reproducing apparatus. When the shutter 22 is closed, the medium 23 can be completely light-shielded similar to the examples described above. Specifically, when the shutter 22 is at the closing position, the shutter-side projections 73 are inserted in the housing-side recesses 74. Thus, if external stray lights try to enter the disc cartridge, they propagate through clearances between the shutter-side projections 73 and housing-side recesses 74. The stray lights propagating toward the back sides of the housing-side recesses 74 are bent at the leading ends of the shutter-side projections 73 (first point). The bent stray lights hit the side walls of the housing-side recesses 74 to be bent again (second point). The stray lights propagate in the clearances between the side walls of the housing-side recesses 74 and the shutter-side projections 73, and hit the shutter 22 to be bent again upon coming out of the housing-side recesses 74 (third point). At this time, if there should be any clearance between the shutter 22 and disc case 21, the stray lights enter the opening section 75 through this clearance. However, since the stray lights are already bent at three points, an amount of light entering the opening section 75 can be sufficiently reduced.

In order to open the shutter 22, the first member 22a and second member 22b may be distanced from the disc case 21 utilizing the protuberances 76 and then may be slide in directions substantially parallel to the outer surfaces of the disc case 21. In this way, the medium 23 can be partly exposed.

As described above, in this embodiment, the light path bending portions are formed by the shutter-side projections formed by bending the opposite ends of the shutter and the housing-side recesses formed in the housing in conformity with the shutter-side projections.

Since the shutter-side projections are respectively provided at the opposite ends of the shutter in this mode, the entrance of stray lights can be suppressed at the opposite sides of the shutter, whereby it can be made more difficult to degrade optical characteristics of the photon mode optical information recording medium. By adopting this construction, there can be provided a disc cartridge capable of sufficiently performing complete light shielding with a simple construction. Further, since it becomes difficult for a user, for example, to easily open the shutter and expose the medium unlike conventional optical disc media, a possibility of making media, particularly those for photon mode recording unusable by error operations can be largely reduced.

In the seventh embodiment, the shutter-side projections are formed by bending the ends of the shutter inward, arranged at the outer side of the housing, and displaceable between the inserted positions where they are inserted in the housing-side recesses and the separated positions located more outward than the inserted positions.

In this mode, when the shutter-side projections are at the inserted positions, stray lights are bent at two points, wherefore it can be made more difficult for the stray lights to reach the photon mode optical information recording medium. On the other hand, since the shutter cannot be moved to the opening position unless the shutter-side projections are moved from the inserted positions to the separated positions, an inadvertent opening of the shutter can be prevented when it is not intended to open the shutter.

In the seventh embodiment, the shutter is comprised of a plurality of members, which are constructed to be partly placed one over the other.

In this mode, the shutter can be constructed by a plurality of members while a stray light shielding effect is maintained, whereby a degree of freedom in designing the shutter can be improved.

It should be noted that the shutter 22 may be integrally formed by a spring member. Specifically, the shutter 22 may integrally include a first lateral portion, a second lateral portion and a connecting portion connecting the first and second lateral portions. The entire shutter 22 is deformed as the connecting portion is warped, whereby the shutter-side projections 73 of first and second lateral portions can be displaced between the inserted positions and separated positions.

The other construction, functions and effects are similar to those of the first embodiment.

Eighth Embodiment

Figure 18:
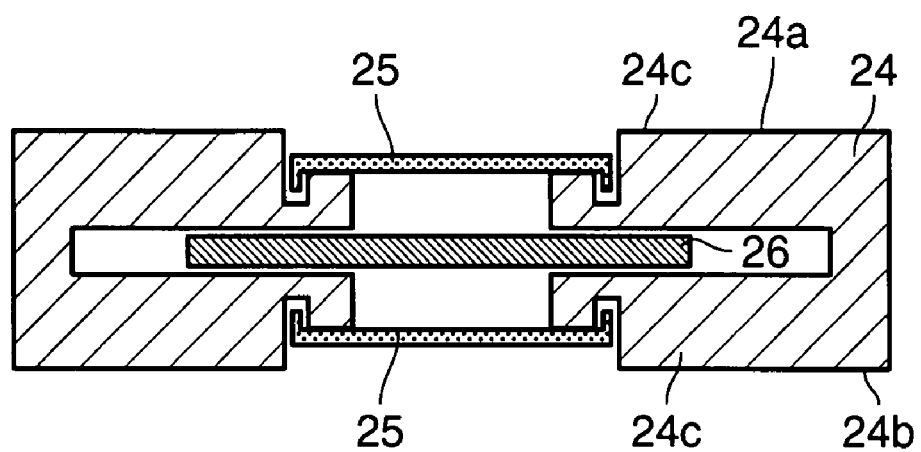
FIG. 18 is a section of a disc cartridge according to an eighth embodiment of the invention.

FIG. 18 shows a disc cartridge according to an eighth embodiment of the present invention. In FIG. 18, identified by 24 is a disc case, by 25 a shutter movably mounted in the disc case 24 and by 26 a disc-shaped medium used in photon mode recording.

The disc case 24 according to the eighth embodiment differs from that of the seventh embodiment in that bulging portions 24c are provided, but the others are the same as in the seventh embodiment. The bulging portions 24c are thickened portions so that an upper surface portion 24a and a lower surface portion 24b of the disc case 24 project more outward than the shutter 25. Thus, the outermost surfaces of the shutter 25 are located more inward than the outer surfaces of the disc case.

In the eighth embodiment, the housing includes the bulging portions projecting more outward than the shutter.

In this mode, since the bulging portions of the housing project more outward than the shutter, a risk of exposing a photon mode optical information recording medium by a user or the like opening the shutter can be more effectively reduced. By this construction, it becomes more difficult to open the shutter, for example, by fingers or tweezers, wherefore a risk of exposing a non-recorded medium by the user opening the shutter can be even more effectively reduced.

The other construction, functions and effects are similar to those of the seventh embodiment.

Ninth Embodiment

Figure 19A:
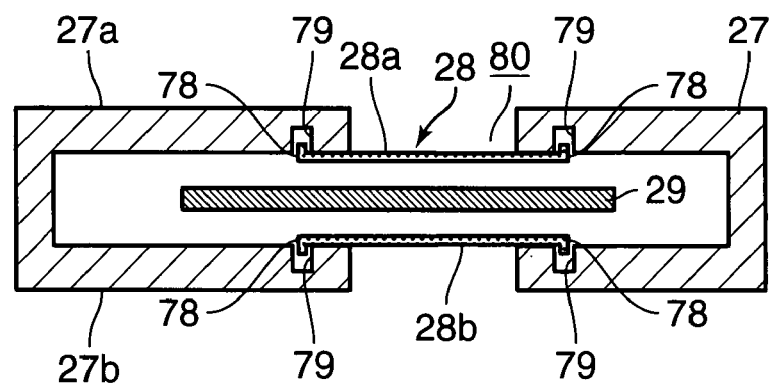
Figure 19B:
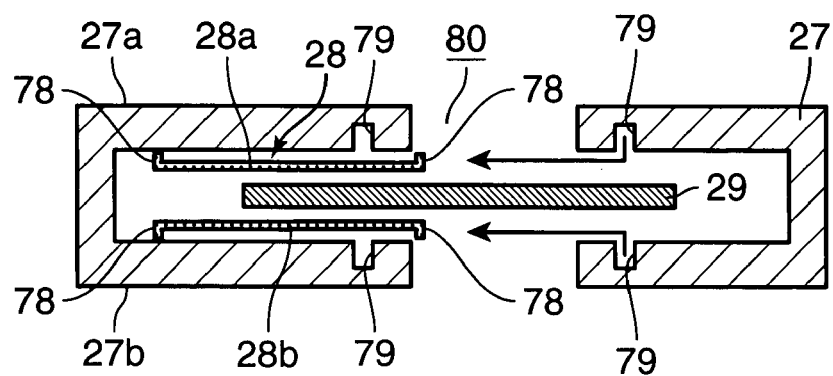

FIGS. 19A and 19B show a disc cartridge according to a ninth embodiment of the present invention.

In FIGS. 19A and 19B, identified by 27 is a disc case, by 28 a shutter movably mounted in the disc case 27 and by 29 a disc-shaped medium used in photon mode recording. FIG. 19A is a section showing a state where the shutter 28 is closed and the medium 29 is completely light-shielded, and FIG. 19B is a section showing a state where the shutter 28 is open and the medium 29 is partly exposed to the outside.

The ninth embodiment differs from the seventh embodiment in that the shutter 28 is arranged inside the disc case 27. Shutter-side projections 78 are bent toward the disc case 27 (outward). The shutter-side projections 78 are arranged inside the disc case 27, and separated positions are located more inward than inserted positions. In order to enable a movement of the shutter 28, a hollow part in the disc case 27 is larger than in the seventh embodiment.

Housing-side recesses 79 are formed in the inner surfaces of upper and lower surface portions 27a, 27b of the disc case 27. In the upper and lower surface portions 27a, 27b, the respective housing-side recesses 79 are provided at the opposite sides of an opening section 80 with respect to moving directions of the shutter 28.

The shutter 28 is comprised of a first member 28a and a second member 28b. The first member 28a opens and closes the opening section 80 of the upper surface portion 27a and the second member 28b opens and closes the opening section 80 of the lower surface portion 27b. The first and second members 28a, 28b may be so constructed as to be biased from the inner side toward the outer sides of the disc case 27 by means of biasing means such as unillustrated springs.

In order to open the shutter 28, the shutter 28 may be pressed inward of the disc case 27, for example, by means of members in an optical information recording/reproducing apparatus to displace the shutter-side projections 78 to the separated positions, and the shutter 28 may be slid in a direction substantially parallel to the outer surfaces of the disc case 27 in this state to be opened. In this way, the medium 29 can be partly exposed.

As described above, in the ninth embodiment, the shutter-side projections are formed by bending the ends of the shutter outward, arranged inside the housing, and displaceable between the inserted positions where they are inserted in the housing-side recesses and the separated positions located more inward than the inserted positions.

In this mode, when the shutter-side projections are at the inserted positions, stray lights are bent at two points, wherefore it can be made more difficult for the stray lights to reach a photon mode optical information recording medium. On the other hand, since the shutter cannot be moved to the opening position unless the shutter-side projections are moved from the inserted positions to the separated positions, an inadvertent opening of the shutter can be prevented when it is not intended to open the shutter. By adopting this construction, there can be provided a disc cartridge capable of sufficiently performing complete light shielding with a simple construction. Further, since it becomes difficult for a user, for example, to easily open the shutter and expose the medium unlike conventional optical disc media, a possibility of making media, particularly those for photon mode recording unusable by error operations can be largely reduced.

The other construction, functions and effects are similar to those of the seventh embodiment.

Tenth Embodiment

Figure 20A:
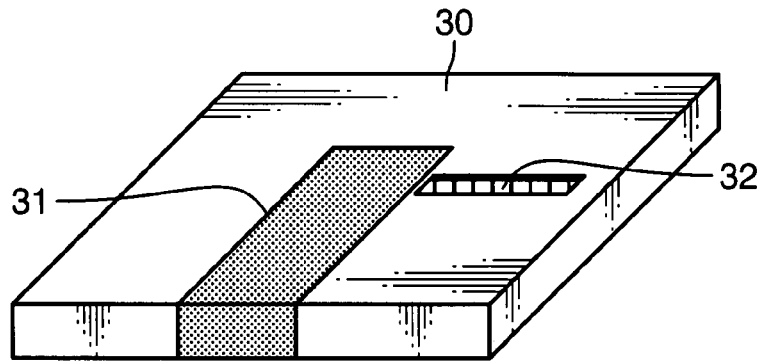
Figure 20B:
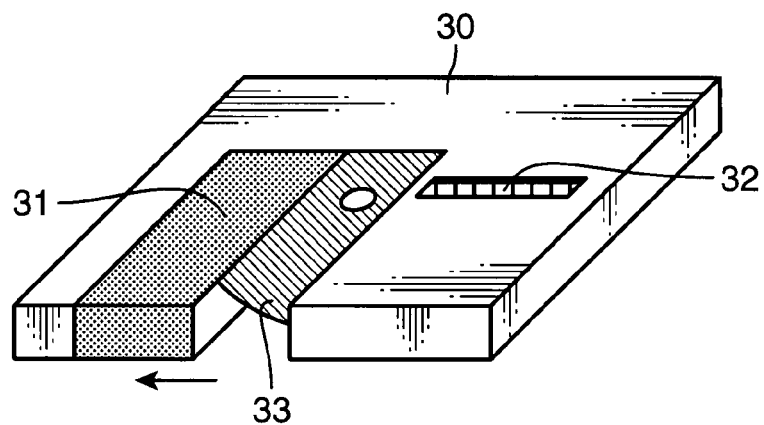
Figure 20C:
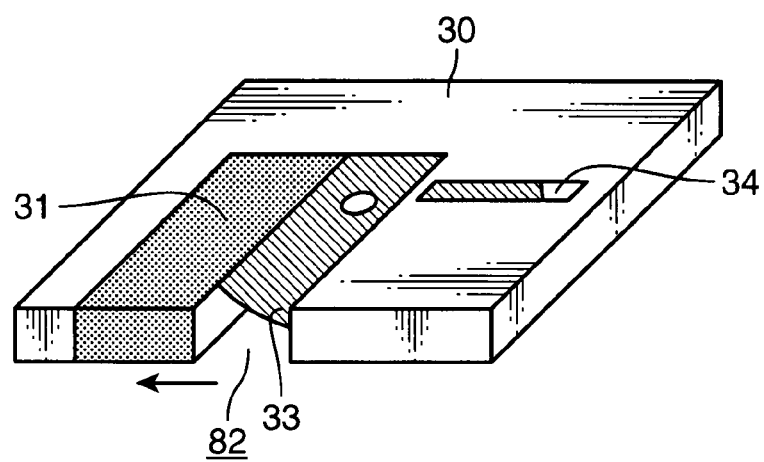

FIGS. 20A to 20C show a disc cartridge according to a tenth embodiment of the present invention. In this embodiment, a disc case is formed with a plurality of opening sections having different shapes.

In FIGS. 20A to 20C, identified by 30 is a disc case, by 31 a shutter movably mounted in the disc case 30, by 32 a shutter having a different shape from the shutter 31, by 33 a disc-shaped medium used in photon mode recording and by 34 an opening section formed when the shutter 32 is opened. The opening section 34 has a different purpose from an opening section 82.

Many of generally used photon recording media such as hologram media are made of organic materials. Thus, upon being photosensitized by a light having a specified wavelength, polymerization from monomers to polymers occurs along a light intensity distribution in a medium. This generates a substantial change in the refractive index of the media and the index is recorded. For example, in shift multiplexing holographic recording, a multiplexed hologram is formed while slightly displacing a hologram recording position. Thus, monomers present in a certain area are consumed (changed to polymers) little by little. Generally, since a part or the entirety of a recording light (signal light and reference light) is used as a reproduced light in a holographic recording/reproducing apparatus, polymerization is caused to occur by the reproduced light if there still remain monomers. At this time, since the consumption of the monomers is accompanied by the absorption of the reproduced light and a change in the refractive index of the media, a reproduced signal in the case of reproduction while consuming the monomers and the one in the case of reproduction in a state where there is no monomer consumption differ. Thus, for example, in a state containing a great number of monomers to be actually consumed, there is a problem that the signal changes every time being reproduced. In order to avoid this problem, an incoherent light is normally irradiated to a recorded area of the medium after the completion of the recording to consume all the remaining monomers (generally, called "curing"). Since a light source used for curing preferably emits an incoherent light as described above, an LED or the like is provided in the apparatus in many cases, for example, separately from a laser light source used for optical recording/reproducing. Although it depends on the type of the medium, sufficient light irradiation is necessary for curing in order to completely consume remaining monomers. Accordingly, it is essential to give sufficient energy as an integrated light amount expressed by a product of an irradiation power density and an irradiation time.

FIG. 20A is a perspective view showing a state where the disc cartridge is outside an optical information recording/reproducing apparatus. Specifically, the both shutters 31, 32 are closed. FIG. 20B is a perspective view showing a state of the disc cartridge when the disc cartridge is inserted into the optical information recording/reproducing apparatus for optical recording. At this time, the shutter 31 is opened and the shutter 32 is closed. FIG. 20C is a perspective view showing a state of the disc cartridge when curing is performed simultaneously with optical recording in the optical information recording/reproducing apparatus. At this time, the both shutters 31, 32 are open.

The construction shown in this example enables the curing of an already recorded area simultaneously with information recording. Specifically, the disc case 30 and shutter 31, and the disc case 30 and shutter 32 are similar to the constructions described above, and the medium is completely light-shielded in the state of FIG. 20A. In other words, any of the constructions according to the first to ninth embodiments can be adopted for the shutters 31 and 32.

The shutters 31, 32 are preferably independently slidable. For example, if the shutters 31, 32 are separately and independently formed, both are separately movable. Thus, only either one of optical recording and curing can be performed or optical recording and curing can be simultaneously performed.

In the tenth embodiment, the housing is formed with a plurality of opening sections, for each of which the corresponding shutter is provided.

In this mode, the entrance of stray lights can be suppressed even in the case where the housing is formed with a plurality of opening sections having different purposes.

Further, in the tenth embodiment, the respective shutters are independently movable.

In this mode, the respective shutters can be opened according to needs. This can avoid an inadvertent opening of the shutters and can make it more difficult to degrade optical characteristics of a photon mode optical information recording medium.

Although the shutter has an integral construction in the first to fourth, sixth and tenth embodiments, the present invention is not limited thereto and arbitrary openings of the disc case can be formed, for example, by two or more shutters. At this time, similar light-shielding effects can be obtained by placing at least parts of a plurality of shutters arranged at the same opening section one over another or holding parts of the plurality of shutters each other.

Eleventh Embodiment

In order to completely shield lights in a photosensitive wavelength band irradiated to a medium, light shielding by an approach taking into account the materials of the disc case and shutter is necessary in addition to the realization of complete light shielding by the disc cartridge construction as in the above described examples. For example, since a general hologram medium or the like has sensitivity to visible lights (particularly lights having wavelengths equal to or below 550 nm), it is necessary not to use an inexpensive plastic used for general optical disc cartridges, but to use an expensive material containing carbon or the like as materials for the disc case and shutter. Therefore, we studied a mix of a light absorbing material with an inexpensive plastic material and the use of a disc cartridge comprised of a thicker disc case and a shutter.

Specifically, organic pigments having a large characteristic of absorbing lights in a wavelength band equal to or below 550 nm were mixed into polycarbonate, and plates having various thicknesses were produced experimentally. Then, light transmission characteristics of these plates were compared. As a result of this experiment, a relationship between the plate thickness and the transmittance for light having a wavelength of 532 nm was: transmittance of about 3% with a plate thickness of 0.5 mm, transmittance of about 0.005% with a plate thickness of 0.7 mm, transmittance of about 0.0001% with a plate thickness of 1.0 mm and transmittance of about 0.000001% or below with a plate thickness of 2 mm.

Generally, light irradiation intensity under direct sunlight in the case of strongest sunshine is said to be about 80000 luxes (=80000 lumens/m$^2$). Out of it, an energy amount in a wavelength band for photosensitizing the above hologram medium can be thought to be about 100 watts/m$^2$ at the outside. Since 1 watt=1 joule/sec., the above energy amount is about 10 millijoules/cm$^2$/sec. On the other hand, the recording of a hologram medium is performed by an energy of about 10 microjoules per hologram having a size of, e.g. 2 mm×2 mm. If the energy of unnecessary lights (in the wavelength band in which photosensitive members react) irradiated to the medium is given 25 millijoules/cm$^2$ as an integrated energy, the medium is degraded. In other words, if an uncovered medium is left under strong direct sunlight, it is degraded in about 2.5 seconds. If actual use is considered from these estimation and experimental result, the transmittance of the disc case or shutter needs to be reduced to or below 0.01% so that the integrated energy does not reach 25 millijoules/cm$^2$ even if the medium is left, for example, for five hours under the direct sunlight.

From our experimental result was deduced a result that the light irradiation mount to the medium could lie within the aforementioned range with a thickness of about 0.7 mm of above if the above material was used for the disc case, shutter and the like. The thickness of most common hologram media is about 1 mm at present. If a minimum spacing between the medium and the disc case or shutter to ensure a mechanical margin for the rotation of the medium is 0.8 mm (about the same as optical discs such as DVDs), the disc cartridge sufficiently ensuring an optical characteristic degradation can be obtained by setting the thickness of the entire disc cartridge to or above 4 mm. Further, the transmittance of the disc case or shutter needs to be set to or below 0.00007% in order to prevent the integrated energy from reaching 25 millijoules/cm$^2$ even if the medium is left for 500 hours under the direct sunlight as a more severe condition. In the case of using a material similar to the above for the disc case, the light irradiation amount to the medium inside can lie within the aforementioned range if the disc case has a thickness of 2 mm or larger. Therefore, the disc cartridge having high reliability can be provided.

Twelfth Embodiment

The disc cartridges capable of complete light shielding and effectively used in photon mode optical information recording are described in the first to eleventh embodiments, whereas an optical information recording/reproducing apparatus using the disc cartridge shown in any one of the first to eleventh embodiments is described in a twelfth embodiment.

One of most important factors of a photon mode optical information recording/reproducing apparatus is the light shielding of a medium during information recording. Since common optical recording/reproducing apparatuses represented by magnetooptical discs and DVDs do not necessitate an optical covering structure, an external light brought in through a clearance of a medium inserting portion or the like reaches a disc cartridge and a medium. However, in a photon mode optical information recording/reproducing apparatus, sufficient stray light shielding needs to be performed when a medium is exposed in the apparatus.

Figure 21:
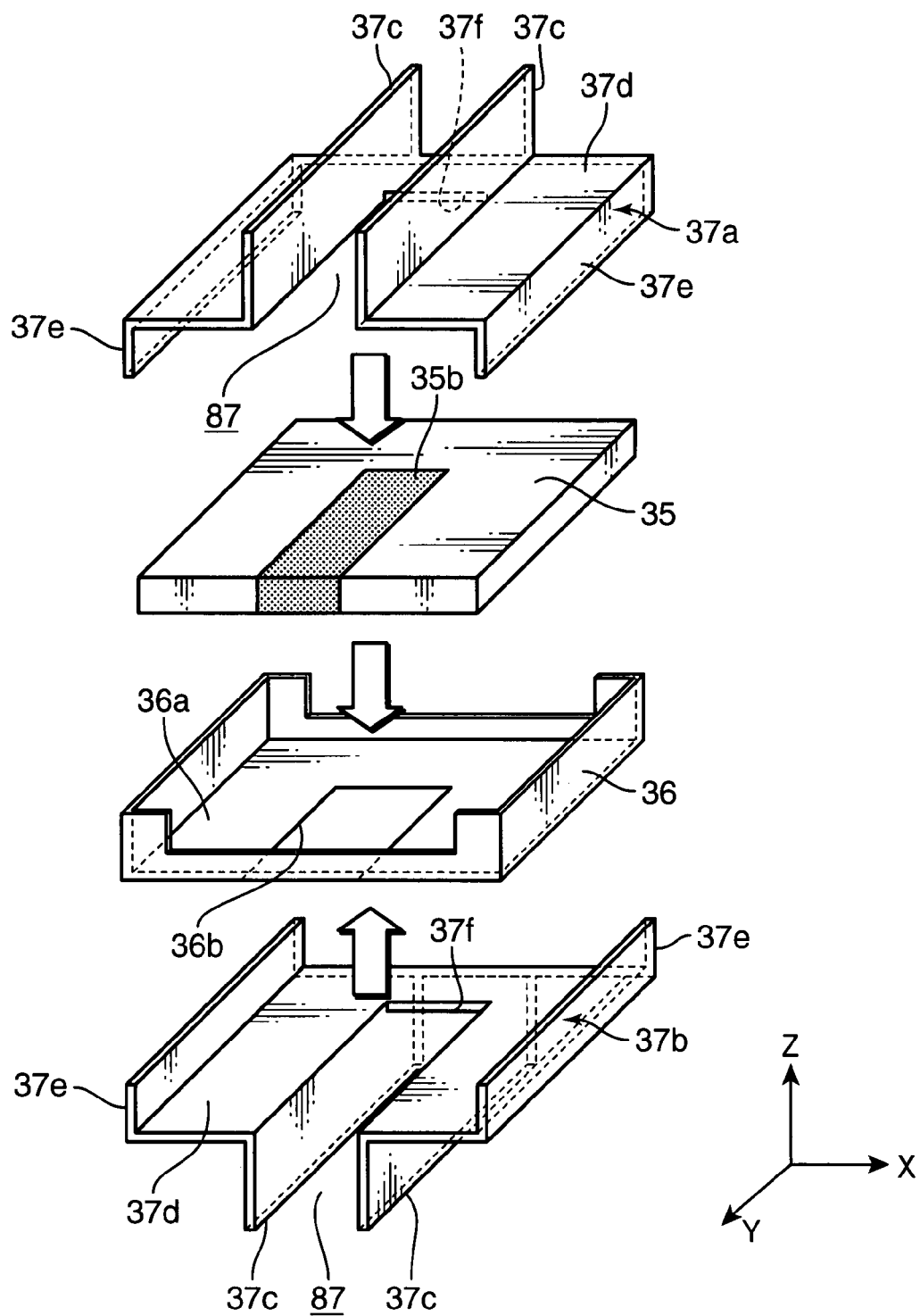
FIG. 21 is a perspective view showing a structural element and a tray provided in an optical information recording/reproducing apparatus according to a twelfth embodiment of the invention together with a disc cartridge.

Accordingly, we considered the following construction. FIG. 21 shows an exemplary construction for suppressing the entrance of stray lights to the exposed medium upon the optical recording in an optical information recording/reproducing apparatus.

In FIG. 21, identified by 35 is a disc cartridge having a complete light shielding construction by enclosing a medium, by 36 a tray as a holder for holding the disc cartridge 35 in the optical information recording/reproducing apparatus, and by 37a and 37b structural elements having parts that come into contact with the disc cartridge 35 or tray 36 without any clearance to it. The tray 36 and structural elements 37a, 37b are provided in the optical information recording/reproducing apparatus.

Figure 22A:
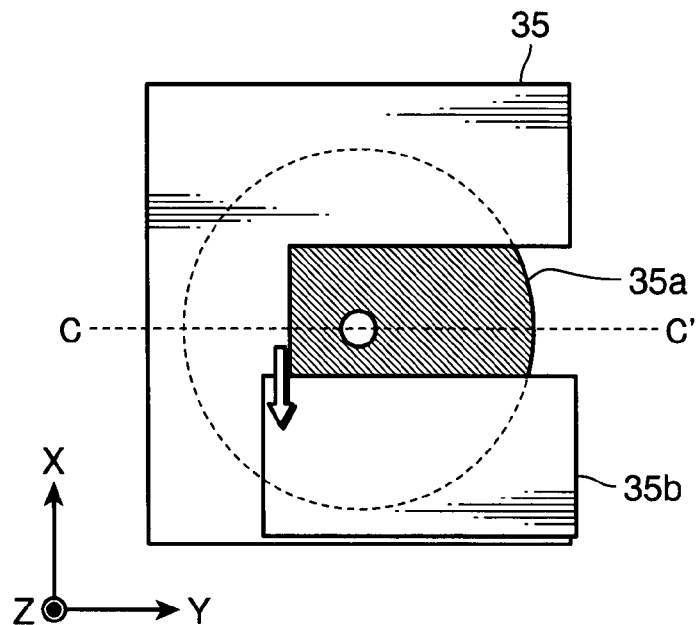
FIG. 22 is a schematic diagram showing an optical head of the optical information recording/reproducing apparatus.
Figure 22B:
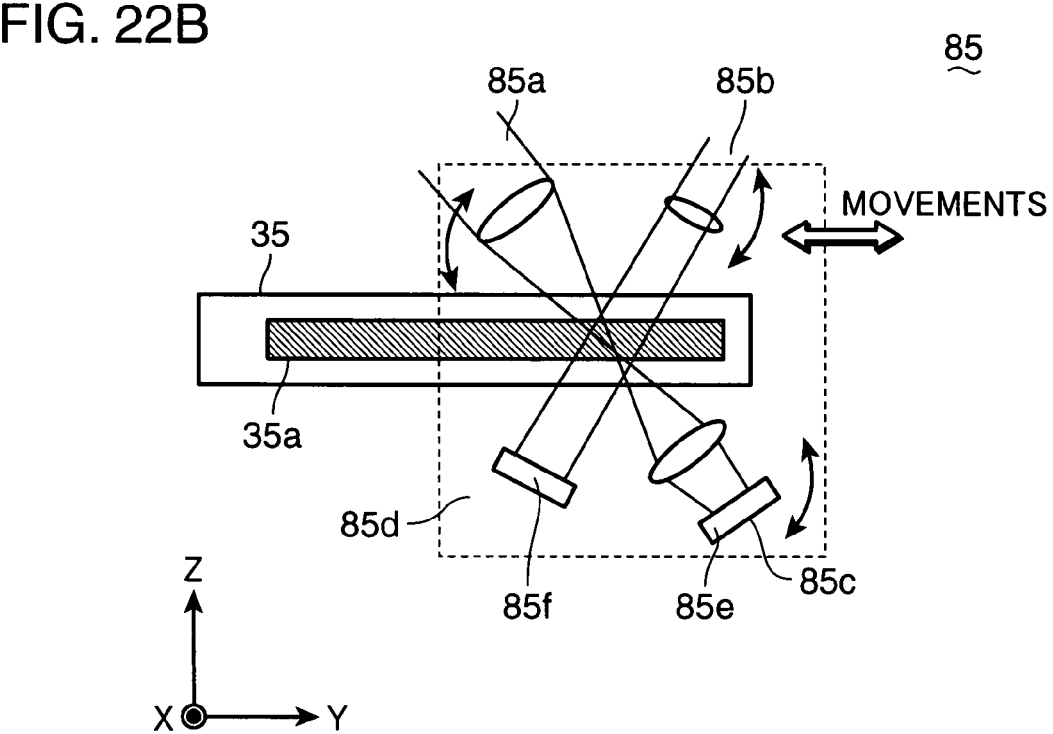

For example, in the case of adopting a holographic recording method of the transmission type, a light irradiating portion and a signal light receiving portion of an optical head 85 are arranged at the opposite sides of the disc cartridge 35 as shown in FIG. 22. The light irradiating portion includes a signal section 85a for irradiating a signal light beam to the medium 35a through a lens and a reference section 85b for irradiating a reference light beam to the medium 35a through a lens. Further, the signal light receiving portion includes a signal section 85c having an imaging device 85e or the like for detecting the signal light beam, and a reference section 85d having a beam stopper 85f or the like on which the reference light beam is incident. The signal light beam and reference light beam are incident on the medium 35a in different directions in a Y-Z plane. In the case of adopting an angle multiplexing method as the holographic recording method, multiplexing recording needs to be performed by changing the incident angles of the signal light beam and reference light beam in the Y-Z plane in FIG. 22. Further, in the case of recording in an arbitrary area extending from the inner periphery to the outer periphery of the medium 35a, the entire optical head 85 including the lenses, the imaging device 85e and the like needs to be moved along a radial direction (Y-direction) of the medium 35a. Thus, it is essential that any of the tray 36 and the structural elements 37a and 37b does not hinder an optical or mechanical access of an optical part such as the optical head 85 to the medium 35a.

Thus, as shown in FIG. 21, an opening section 36b is formed in a bottom surface portion 36a of the tray 36, whereas the structural elements 37a, 37b are provided with light shielding plates 37c at the opposite sides of an opening section of the disc cartridge 35. The opening section 36b of the tray 36 is formed in a range including the opening section of the disc cartridge 35 placed on the bottom surface portion 36a.

Each of the structural elements 37a, 37b is attached to the tray 36, and includes a main portion 37d, leg portions 37e formed at the opposite ends of the main portion 37d, and the light shielding plates 37c provided on the main portion 37d. The structural elements 37a, 37b are coupled to the tray 36 by holding the tray 36 by both leg portions 37e. The tray 36 is sandwiched between the structural elements 37a, 37b.

Each main portion 37d has substantially the same shape as the bottom surface portion 36a of the tray 36, and is formed with an opening section 37f. This opening section 37f is formed in a range including the opening section of the disc cartridge 35.

The light shielding plates 37c in the form of flat plates are provided at the opposite sides of the opening section 37f in a tangent direction (X-direction) of the medium 35a. In other words, since the optical head 85 is movable along the radial direction (Y-direction) of the medium, the light shielding plates 37c are not provided at the opposite sides of the opening of the disc cartridge 35 with respect to Y-direction.

The light shielding plates 37c are wall structures standing up in a direction perpendicular to the medium 35a and parallel to Y-direction. By the light shielding plates 37c, the entrance of stray lights to the medium 35a from the opposite sides with respect to X-direction can be prevented. Thus, considerable light shielding can be performed, for example, in spaces 87 above and below the disc cartridge 35 defined by the light shielding plates 37c and medium 35a and the characteristic degradation of the medium due to an optical factor in the optical information recording/reproducing apparatus can be avoided. Thus, the restriction of the arrangement of members and the like around the tray 36 in the optical information recording/reproducing apparatus can be suppressed.

Figure 23:
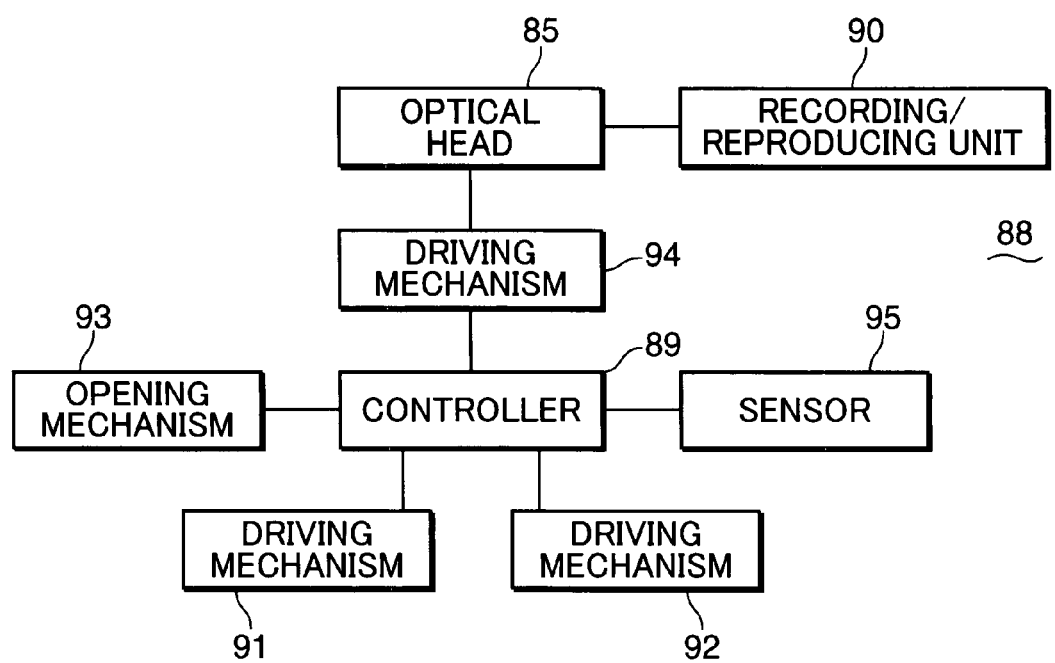
FIG. 23 is a control block diagram of the optical information recording/reproducing apparatus.

As shown in FIG. 23, an optical information recording/reproducing apparatus 88 is provided with a controller 89, the optical head 85, a recording/reproducing unit 90, a driving mechanism (first driving mechanism) 91 for the tray 36, a driving mechanism (second driving mechanism) 92 (for the structural elements 37a, 37b), a shutter opening mechanism 93, a driving mechanism (third driving mechanism) 94 for the optical head 85, etc. The first driving mechanism 91 is for moving the tray 36 between an outside position and an inside position. The outside position is a position where the tray 36 is moved out of the apparatus, and the inside position is a position where the tray 36 is located in the apparatus. The second driving mechanism 92 is for moving the structural elements 37a, 37b between joined positions and separated positions. The joined positions are positions where the structural elements 37a, 37b are joined with the tray 36, and the separated positions are positions where the structural elements 37a, 37b are separated from the tray 36. The shutter opening mechanism 93 is for moving a shutter 35b of the disc cartridge 35 between a closing position and an opening position and includes, for example, an arm (not shown) accessible to the shutter 35b of the disc cartridge 35 placed on the tray 36 at the inside position. The third driving mechanism 94 is for moving a lens and the like of the light irradiating portion and changing the orientations thereof. This driving mechanism 94 also moves the optical head 85 itself.

In the optical information recording/reproducing apparatus, the disc cartridge 35 is placed on the tray 36, for example, serving as a holding mechanism for the disc cartridge 35, and this tray 36 is inserted into the apparatus by means of the first driving mechanism 91. Then, the second driving mechanism 92 moves the structural elements 37a, 37b from the separated positions to the joined positions. Thus, the structural elements 37a, 37b sandwich the tray 36 together with the disc cartridge 35 from above and below and adhere to the tray 36. Here, if a recess is so formed in a movable range of the shutter 35b as to prevent the contact of the disc cartridge 35 and the structural elements 37a, 37b, the shutter can be easily opened and closed. It should be noted that the second driving mechanism may be omitted. In such a case, the structural elements 37a, 37b are formed to be joined, and the tray 36 having the disc cartridge 35 placed thereon is inserted between the both structural elements 37a, 37b.

Figure 24:
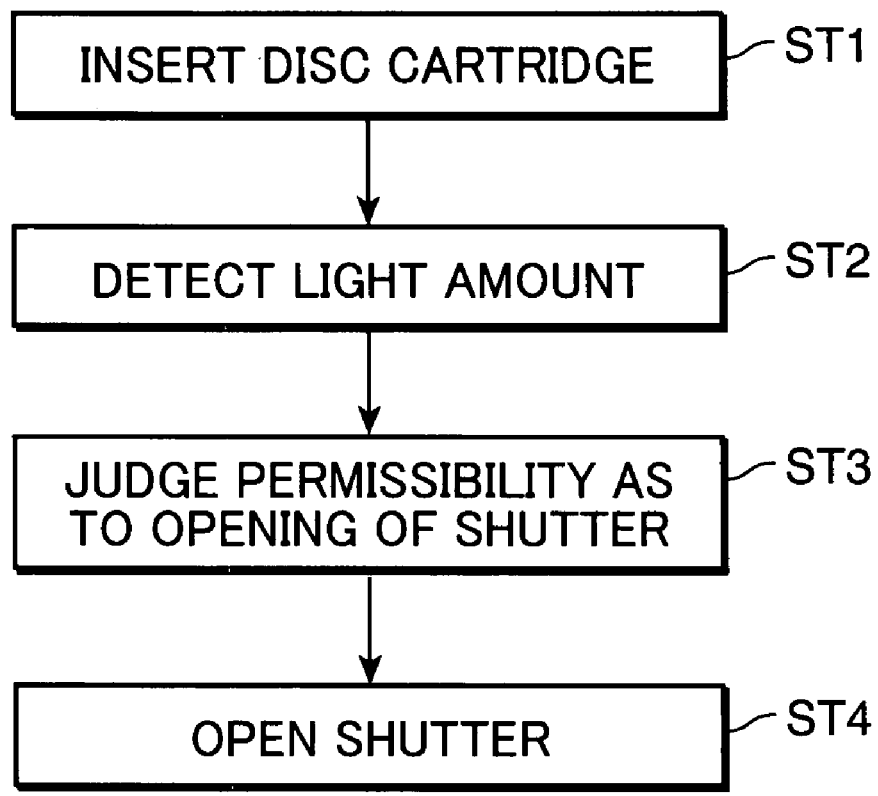
FIG. 24 is a control flow diagram of the optical information recording/reproducing apparatus.

When the structural elements 37a, 37b adhere to the tray 36, the shutter 35b of the disc cartridge 35 is closed. This shutter 35b is preferably opened upon confirming the light shielding by the structural elements 37a, 37b. For example, sensors 95 as detectors for detecting a light amount may be arranged in the spaces 87. A control operation in this case is shown in FIG. 24. First, when the tray 36 is moved from the outside position to the inside position to introduce the disc cartridge 35 into the apparatus (Step ST1), light amounts in the spaces 87 are detected by the sensors 95 (Step ST2). In the controller 89, judgment is made as to whether or not the opening of the shutter 35b is permissible depending on whether or not the light amounts are equal to or below a specified value (Step ST3). The shutter 35b is kept at the closing position until the light amounts fall to or below the specified value. When the light amounts fall to or below the specified value, the arm is driven to open the shutter 35b (Step ST4). In this way, an inadvertent opening of the shutter 35b of the disc cartridge 35 with stray lights present in the spaces 87, for example, due to the trouble of the apparatus can be avoided, whereby the degradation of the medium 35a can be effectively suppressed.

In order to avoid the entrance of stray lights through a disc cartridge insertion opening of the optical information recording/reproducing apparatus, the disc cartridge 35 and structural elements 37a, 37b are preferably united and moved along the thickness direction of the disc cartridge (vertical direction) after the disc cartridge 35 is inserted. In this way, light shielding in the spaces formed by the disc cartridge 35 or tray 36 and the structural elements 37a, 37b can be more effectively performed.

The twelfth embodiment concerns an information recording/reproducing apparatus for at least either recording or reproducing information in or from a photon mode optical information recording medium, and is provided with the holder for holding the disc cartridge, and the structural elements including light shielding plates for suppressing the entrance of stray lights into the disc cartridge and attachable to the holder.

Accordingly, the entrance of stray lights into the disc cartridge can be suppressed by the light shielding plates upon the optical recording, wherefore the degradation of the photon mode recording medium can be suppressed.

The twelfth embodiment is further provided with the detectors for detecting the light amounts in the spaces formed by the disc cartridge and the light shielding plates, and the controller for making judgment as to whether the opening or closing of the shutter is permissible based on the detection result by the detectors.

In this mode, an inadvertent opening of the shutter despite the presence of stray lights due to the trouble or the like of the apparatus can be reliably prevented.

The present invention is applicable to a disc cartridge accommodating a photon mode optical information recording medium and also to an information recording/reproducing apparatus for at least either recording or reproducing information in or from a photon mode optical information recording medium.

What is claimed is:

1. A disc cartridge accommodating a photon mode optical information recording medium, comprising:
a housing having an opening section; and
a shutter disposed so as to be movable between a closing position to close said opening section and an opening position to open said opening section,
wherein said housing includes a light path bending portion that bends a clearance between said shutter at the closing position and said housing at least at two points, said light path bending portion being formed by a housing-side recess formed in an edge portion of said opening section in said housing such that said shutter at the closing position is located therein,
wherein an end portion of said shutter is substantially parallel to a moving direction thereof, and
wherein said housing-side recess is tapered such that a width of said housing-side recess in a thickness direction of said shutter narrows toward a deep end of said housing-side recess from said edge portion of said opening section.

2. A disc cartridge according to claim 1, wherein
said light path bending portion includes a plurality of shutter-side recesses formed in said shutter and said housing-side recess is one of a plurality of housing-side recesses formed in said edge portion of said opening section in said housing,
said edge portion of said opening section in said housing is located in said shutter-side recesses when said shutter is at the closing position, and
said shutter at the closing position is insertable into said housing side recesses.

3. A disc cartridge according to claim 2, wherein:
said housing-side recess is formed such that said end portion of said shutter at the closing position is insertable thereinto, and
said housing includes an elastic member with which another end portion of said shutter at the closing position is held in close contact.

4. A disc cartridge according to claim 1, wherein said housing and said shutter are formed from a light absorbing material.

5. A disc cartridge according to claim 1, wherein
said housing has a plurality of opening sections, and
said shutter is one of a plurality of shutters, and one shutter from said plurality of shutters is provided in each opening section.

6. A disc cartridge according to claim 5, wherein each shutter of said plurality of shutters is independently movable.

7. A disc cartridge according to claim 1, wherein the clearance between said housing and said shutter is set to be equal to or larger than 100 µm and equal to or smaller than 200 µm.

8. A photon mode optical information recording/reproducing apparatus for at least either recording or reproducing information in or from a photon mode optical information recording medium, comprising:
a disc cartridge including a housing having an opening section; and
a shutter disposed so as to be movable between a closing position to close said opening section and an opening position to open said opening section, wherein at least one of said housing and said shutter includes a light path bending portion that bends a clearance between said shutter at the closing position and said housing at least at two points;
a holder configured to hold said disc cartridge;
a structural element including a light shielding plate configured to suppress the entrance of stray light into said disc cartridge and attachable to said holder;
a detector for configured to detect a light amount in a space formed by said disc cartridge and said light shielding plate; and
a controller configured to determine whether the opening or closing of said shutter is permissible based on a detection result by said detector.

9. A disc cartridge accommodating a photon mode optical information recording medium, comprising:
a housing having an opening section; and a shutter disposed so as to be movable between a closing position to close said opening section and an opening position to open said opening section, wherein said housing includes a light path bending portion that bends a clearance between said shutter at the closing position and said housing at least at two points, said light path bending portion being formed by a housing-side recess formed in an edge portion of said opening section in said housing such that said shutter at the closing position is located therein, and wherein an end portion of said shutter is tapered such that said end portion of said shutter becomes thicker toward an end of said shutter from a center portion of said shutter in a moving direction, and said housing-side recess is substantially parallel such that a clearance between said housing and said shutter narrows toward said end of said shutter.

10. A disc cartridge accommodating a photon mode optical information recording medium, comprising:

a housing having an opening section; and a shutter disposed so as to be movable between a closing position to close said opening section and an opening position to open said opening section, wherein said shutter includes a light path bending portion that bends a clearance between said shutter at the closing position and said housing at least at two points, said light path bending portion being formed by a shutter-side recess formed in said shutter such that an edge portion of said opening section in said housing is located therein with said shutter held at the closing position, and wherein said shutter-side recess is tapered such that said shutter-side recess narrows toward a center of said shutter from an end of said shutter in a shutter moving direction, and said edge portion of said opening section in said housing is substantially parallel.

* * * * *